US012200819B2

(12) United States Patent
Tamura et al.

(10) Patent No.: US 12,200,819 B2
(45) Date of Patent: Jan. 14, 2025

(54) GATEWAY DEVICE, MOBILITY MANAGEMENT DEVICE, BASE STATION, COMMUNICATION METHOD, CONTROL METHOD, PAGING METHOD, AND COMPUTER-READABLE MEDIUM PRELIMINARY CLASS

(71) Applicant: NEC Corporation, Tokyo (JP)

(72) Inventors: Toshiyuki Tamura, Tokyo (JP); Kouji Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/114,024

(22) Filed: Feb. 24, 2023

(65) Prior Publication Data

US 2024/0022901 A1   Jan. 18, 2024

Related U.S. Application Data

(63) Continuation of application No. 17/400,597, filed on Aug. 12, 2021, now abandoned, which is a
(Continued)

(30) Foreign Application Priority Data

Nov. 2, 2016 (JP) .................................. 2016-215560

(51) Int. Cl.
*H04W 8/30* (2009.01)
*H04W 8/26* (2009.01)
(Continued)

(52) U.S. Cl.
CPC ............... *H04W 8/30* (2013.01); *H04W 8/26* (2013.01); *H04W 52/02* (2013.01);
(Continued)

(58) Field of Classification Search
CPC ......... H04W 8/30; H04W 8/26; H04W 52/02; H04W 52/0216; H04W 68/00;
(Continued)

(56) References Cited

U.S. PATENT DOCUMENTS

| 2012/0202496 A1* | 8/2012 | Okabe ..................... H04W 8/02 455/435.1 |
| 2013/0083650 A1* | 4/2013 | Taleb ...................... H04W 8/30 370/218 |

(Continued)

FOREIGN PATENT DOCUMENTS

| AU | 2011353862 A1 * | 6/2013 | ............ H04W 68/02 |
| CN | 101540990 A | 9/2009 | |

(Continued)

OTHER PUBLICATIONS

3GPP TSG CT4 Meeting #70bis C4-152046 Anaheim, USA; Nov. 16-20, 2015 was C4-151725 (Year: 2015).*

(Continued)

*Primary Examiner* — Nizar N Sivji
(74) *Attorney, Agent, or Firm* — Dickinson Wright PLLC

(57) ABSTRACT

The present disclosure is directed to providing a gateway device that can properly page a communication terminal managed by a control device even if the control device loses information on the communication terminal when the control device recovers from a failure that has occurred therein. A gateway device (10) according to the present disclosure includes a storage unit (11) configured to store temporarily allocated identification information temporarily allocated to a communication terminal and an eDRX parameter associated with the communication terminal, and a transceiver (12) configured to, in a case in which downlink data destined for a communication terminal managed by a mobility management device (20) is received after a failure has occurred in the mobility management device (20), transmit a notifi- (Continued)

cation message with the temporarily allocated identification information and the eDRX parameter set therein to the mobility management device (20) or another mobility management device (21).

12 Claims, 14 Drawing Sheets

Related U.S. Application Data continuation of application No. 16/346,796, filed as application No. PCT/JP2017/039681 on Nov. 2, 2017, now Pat. No. 11,122,422.

(51) Int. Cl.
| | |
|---|---|
| H04W 52/02 | (2009.01) |
| H04W 68/00 | (2009.01) |
| H04W 68/02 | (2009.01) |
| H04W 76/28 | (2018.01) |
| H04W 88/12 | (2009.01) |
| H04W 88/16 | (2009.01) |
| H04W 92/06 | (2009.01) |

(52) U.S. Cl.
CPC ....... *H04W 52/0216* (2013.01); *H04W 68/00* (2013.01); *H04W 68/02* (2013.01); *H04W 76/28* (2018.02); *H04W 88/12* (2013.01); *H04W 92/06* (2013.01); *H04W 88/16* (2013.01); *Y02D 30/70* (2020.08)

(58) Field of Classification Search
CPC ..... H04W 68/02; H04W 76/28; H04W 88/12; H04W 92/06; H04W 88/16; Y02D 30/70
See application file for complete search history.

(56) References Cited

U.S. PATENT DOCUMENTS

| | | | | |
|---|---|---|---|---|
| 2013/0148594 A1* | 6/2013 | Nishida | ............... | H04W 76/19 370/329 |
| 2013/0188555 A1* | 7/2013 | Olsson | ................ | H04W 8/30 370/328 |
| 2015/0173121 A1* | 6/2015 | Miklos | ............... | H04W 68/00 370/329 |
| 2015/0223196 A1* | 8/2015 | Kim | .................. | H04W 68/02 455/458 |
| 2016/0262041 A1* | 9/2016 | Rönneke | ............ | H04W 28/0221 |
| 2016/0345380 A1 | 11/2016 | Diachina et al. | | |
| 2016/0360441 A1* | 12/2016 | Shi et al. | ............ | H04W 28/04 |
| 2017/0339611 A1* | 11/2017 | Landais | .............. | H04W 8/06 |
| 2018/0176979 A1 | 6/2018 | Ryu et al. | | |
| 2018/0242246 A1* | 8/2018 | Ryu | .................. | H04W 76/10 |
| 2018/0248658 A1 | 8/2018 | Belleschi et al. | | |

FOREIGN PATENT DOCUMENTS

| | | | | |
|---|---|---|---|---|
| CN | 101646270 A | 2/2010 | | |
| CN | 102217360 A | 10/2011 | | |
| CN | 102905369 A | 1/2013 | | |
| CN | 103380647 A | 10/2013 | | |
| EP | 2584860 A1 * | 4/2013 | ......... | H04L 65/1016 |
| EP | 3367735 A1 * | 8/2018 | ........ | H04W 52/0209 |
| FR | 3057134 A1 * | 4/2018 | ......... | H04L 63/0823 |
| JP | 2009-171596 A | 7/2009 | | |
| JP | 2013537375 A | 9/2013 | | |
| WO | WO-2015123871 A1 * | 8/2015 | ............ | H04W 28/04 |
| WO | WO-2016119263 A1 * | 8/2016 | ......... | H04L 41/0668 |

OTHER PUBLICATIONS

3GPP TSG-RAN3 #93bis R3-182483 Oct. 10-14, 2016 Sophia Antipolis, France Title Abnormal case for eDRX configuration (Year: 2016).*

3GPP TSG RAN WG2 Meeting #95 R2-164998 Gothenburg, Sweden, Aug. 22-26, 2016 Title Remaining issues in eDRX PH and PTW calculations (Year: 2016).*
Chinese Office Action for CN Application No. 201780079786.2 mailed on Jun. 1, 2021 with English Translation.
International Search Report corresponding to PCT/JP2017/039681, mail date Jan. 23, 2018, 2 pages.
3GPP TS 23.401 V14.1.0 (Sep. 2016), 3rd Generation Partnership Project; Technical Specification Group Services and System Aspects; General Packet Radio Service (GPRS) enhancements for Evolved Universal Terrestrial Radio Access Network (E-UTRAN) access (Release 14), Sep. 2016, 378 pages.
3GPP TS 23.007 V14.1.0 (Sep. 2016), 3rd Generation Partnership Project, Technical Specification Group Core Network and Terminals; Restoration procedures (Release 14), 97 pages.
EGPP TS 23.401 V 13.8.0 (Sep. 2016), 3rd Generation Partnership Project; Technical Specification Group Services and System Aspects; General Packet Radio Service (GPRS) enhancements for Evolved Universal Terrestrial Radio Access Network (E-UTRAN) access, (Release 13), 373 pages.
3 GPP TR 23.857 V1.10.0 (Oct. 2012), 3rd Generation Partnership Project; Technical Specification Group Core Network and Terminals; Study of EPC Nodes Restoration; (Release 11), 66 pages.
NEC, MME node failure for eDRX UE, 3GPP TSG CT4 Meeting #75, C4-166017, Nov. 14-18, 2016, 4 pages.
Nokia, Alcatel-Lucent Shanghai Bell, Correction of eDRX Information, 3GPP TSG-RAN WG3 Meeting #93bis, R3-162412, Oct. 10-14, 2016, 2 pages.
Nokia, 3GPP TSG-RAN WG3 #93bis, Nokia, Alcatel-Lucent Shanghai Belll, Correction of eDRX Information, 3GPP TSG-RAN WG3 #93bis, R3-162413, Oct. 10-14, 2016, 4 pages.
NTT DOCOMO, INC., Abnormal case for eDRX configuration, 3GPP TSG-RAN WG3#93bis, R3-162483, Oct. 10-14, 2016, 2 pages.
3GPP TS 29.274 V12.14.0—Technical Specification 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12) (Dec. 2017) (Year: 2017).
3GPP TR 23.857; 3rd Generation Partnership Project; Technical Specification Group Core Network and Terminals; Study of EPC Nodes Restoration; (Release 11) V1.10.1 (Oct. 2012) (corresponds to Technical Specification Group Core Network and Terminals; Study of EPC Nodes Restoration; (Release 11), 3GPP TSG-CT WG4#59 C4-122394, Oct. 2012).
Notice of Reasons for Refusal, drafted Aug. 12, 2020, for Japanese Patent Application No. 2016-215560.
3GPP TS 29.274 v15.2.0 (Dec. 2017)—3GPP Partnership Project, Technical Specification Group Core Network and Terminals; 3GPP Evolved Packet System (EPS); Evolved General Packet Radio Service Tunnelling Protocol for Control Plane; Stage 3 (Release 15) See Specifically Sec. 7.2.11.2 (Year: 2017).
NTT Docomo Paging Optimization for the low mobility devices SA WG2. Meeting #19-23 May 2014, Phoenix, USA (Year: 2014).
Extended European Search Report Issued in European Patent Application No. 17868220.9, dated Jun. 27, 2019, 13 pages.
3GPP 3rd Generation Partnership Project; Technical Specification Group Services and System Aspects; Study on System impacts of Extended Discontinuous Reception (DRX) Cycle for Power Consumption Optimization (Release 13) 3 GPP TR 23.770, V13.0.0 (Sep. 2015), Sep. 21, 2015, pp. 1-42 (42 pages).
Intel Corporation "Remaining Issues in eDRX PH and PTW Calculations", 3GPP TSG RAN WG2 Meeting #95, R2-164998, Gothenburg, Sweden, Aug. 22-26, 2016, 5 pages.
SA3 "[Draft] Comments on Reply to LS on eDRX Paging Timing Calculation and Security Concern", 3GPP TSG-SA WG3 Meeting #84, S3-161147, Chennai, India, Jul. 25-29, 2016, 2 pages.
Japanese Office Action for JP Application No. 2021-001920 mailed on Feb. 8, 2022 with English Translation.
Alcatel-Lucent et al., Services restoration for UEs using extended idle mode DRX, 3GPP TSG-CT WG4#71, C4-152046, Nov. 16-20, 2015.

(56) References Cited

OTHER PUBLICATIONS

JP Office Action for JP Application No. 2022-128696, mailed on Jun. 20, 2023 with English Translation.

\* cited by examiner

Paging message

| IE/Group Name |
|---|
| Message Type |
| UE Identity Index value |
| UE Paging Identity |
| UE Paging Identity2 |

GATEWAY DEVICE, MOBILITY MANAGEMENT DEVICE, BASE STATION, COMMUNICATION METHOD, CONTROL METHOD, PAGING METHOD, AND COMPUTER-READABLE MEDIUM PRELIMINARY CLASS

CROSS-REFERENCE TO RELATED APPLICATIONS

This application is a Continuation of U.S. patent application Ser. No. 17/400,597, filed on Aug. 12, 2021, which is a Continuation of U.S. patent application Ser. No. 16/346,796, filed on May 1, 2019, which issued as U.S. Pat. No. 11,122,422, which is a National Stage entry, under 35 U.S.C. § 371, of International Application PCT/JP2017/039681, filed on Nov. 2, 2017, which claims the benefit of the priority of Japanese Patent Application No. 2016-215560, filed on Nov. 2, 2016, the disclosures of each of which are hereby incorporated by reference in their entirety.

TECHNICAL FIELD

The present disclosure relates to gateway devices, mobility management devices, base stations, communication methods, control methods, paging methods, and programs and relates, in particular, to a gateway device, a mobility management device, a base station, a communication method, a control method, a paging method, and a program for carrying out a paging procedure for a communication terminal.

BACKGROUND ART

The 3rd Generation Partnership Project (3GPP), defining standards for mobile networks, defines a Tracking Area Update (TAU) procedure. The TAU procedure is carried out for a User Equipment (UE), or a communication terminal, to notify a Mobility Management Entity (MME), or a control device, of a change in the Tracking Area (TA). Details of the TAU procedure are defined, for example, in Section 5.3.3.1 of Non Patent Literature 1. In the TAU procedure, used as an identifier of a UE is not an International Mobile Subscriber Identity (IMSI), which is an identifier unique to each UE, but a Globally Unique Temporary UE Identity (GUTI), which is a temporary identity (ID) that the MME allocates to each UE. The GUTI is desirably changed periodically from the security viewpoint. Therefore, the GUTI is changed in a GUTI Reallocation procedure (see Section 5.3.7 of Non Patent Literature 1). The GUTI Reallocation procedure may be carried out within the TAU procedure or may be triggered independently from the TAU procedure. Thus, the UE is notified of the changed GUTI by the MME.

In the TAU procedure, the MME transmits, to the UE, a TAU Accept message that includes the changed GUTI to thus notify the UE of the changed GUTI. In response to the TAU Accept message, the UE transmits a TAU Complete message to the MME. As the MME receives the TAU Complete message, the MME can confirm that the UE has been notified of the changed GUTI.

Now, a packet receiving operation defined in 3GPP will be described. For example, in Section 5.3.4.3 of Non Patent Literature 1, a Network (NW) Triggered Service Request procedure is defined as a specific example of the packet receiving operation. In the NW Triggered Service Request procedure, upon receiving a notification indicating that a packet has been received, the MME transmits a Paging message to an evolved NodeB (eNB), or a base station. Upon receiving the Paging message, the eNB pages the UE. Thus, the UE is notified that the packet has been received.

The UE executes a Discontinuous Reception (DRX) function of periodically monitoring the paging channel. When an Internet of Things (IoT) device is used as a UE, the IoT device may execute an Extended Idle Mode DRX (eDRX) function in which the monitoring cycle is extended from that in the DRX function for power saving. When the UE executes the eDRX function, the cycle of monitoring the paging channel has a duration of approximately 43 minutes at the maximum.

When the UE executes the eDRX function to monitor the paging channel, the monitoring cycle is calculated from an eDRX parameter and a System Architecture Evolution (SAE)-Temporary Mobile Subscriber Identity (S-TMSI) composed of a part of the GUTI. The monitoring cycle is calculated in each of the UE, the MME, and the eNB. The eDRX parameter may, for example, be a paging time window or the like that indicates the duration for which the monitoring is continued since the UE starts monitoring the paging channel. Hereinafter, the relationship between the GUTI and the S-TMSI will be described.

The GUTI includes a Mobile Country Code (MCC), a Mobile Network Code (MNC), an MME Group ID, an MME Code, and an MME-TMSI (M-TMSI). Meanwhile, the S-TMSI includes the MME Code and the M-TMSI. In other words, the S-TMSI includes the MME Code and the M-TMSI that partially compose the GUTI. The M-TMSI is an identifier changed in the GUTI Reallocation procedure. Specifically, as the GUTI Reallocation procedure is carried out, the S-TMSI that includes the M-TMSI is also changed.

Now, a packet receiving operation carried out when a failure occurs in the MME will be described. When a failure occurs in the MME and the MME then recovers from the failure, the MME will lose the information on the UE stored prior to the failure. The lost information on the UE is, for example, the IMSI for identifying the UE, the GUTI temporarily allocated to the UE, and on. In this state, even if the MME receives a message notifying the MME that a packet has been received from a Serving Gateway (SGW), or a gateway device, the MME cannot identify the UE that is to receive the packet. Thus, the Paging procedure cannot be executed. Therefore, in order to prevent such a situation, when a packet associated with the UE managed by the MME in which a failure has occurred is received, the SGW transmits, to the MME, a message with the IMSI serving as an identifier unique to the UE set therein. This allows the MME to transmit, to the eNB, a Paging message with the IMSI transmitted by the SGW set therein and in turn allows the eNB to page the UE. In this manner, a series of operations in which the MME executes the Paging procedure by the use of the IMSI transmitted by the SGW is referred to as a Network Triggered Service Restoration function. Procedures related to the Network Triggered Service Restoration are described in Chapter 25 of Non Patent Literature 2.

CITATION LIST

Non Patent Literature

Non Patent Literature 1: 3GPP TS23.401 V14.1.0 (2016 September) Chapter 5.3.3.1, Chapter 5.3.4.3, Section 5.3.7

Non Patent Literature 2: 3GPP TS23.007 V14.1.0 (2016 September) Chapter 25

SUMMARY OF INVENTION

Technical Problem

The UE executing the eDRX function monitors the paging channel on the monitoring cycle calculated on the basis of the S-TMSI and the eDRX parameter. However, in a state in which the MME has recovered from a failure and the MME has lost the information on the UE, the MME and the eNB execute the Paging procedure on the basis of the IMSI transmitted by the SGW. This creates a difference between the timing at which the eNB pages the UE and the timing at which the UE monitors the paging channel. This, as a result, leads to a problem in that the UE fails to notice the paging destined for itself.

The present disclosure is directed to providing a gateway device, a mobility management device, a base station, a communication method, a control method, a paging method, and a program that make it possible to properly page a communication terminal (e.g., UE) managed by a control device (e.g., MME) even in a case in which the control device loses information on the communication terminal when the control device recovers from a failure that has occurred therein.

Solution to Problem

A gateway device according to a first aspect of the present disclosure includes a storage unit configured to store temporarily allocated identification information allocated to a communication terminal and an Extended Idle Mode Discontinuous Reception (eDRX) parameter associated with the communication terminal; and a transceiver configured to, in a case in which downlink data destined for a communication terminal managed by a mobility management device is received after a failure has occurred in the mobility management device, transmit a notification message with the temporarily allocated identification information and the eDRX parameter set therein to the mobility management device or another mobility management device.

A mobility management device according to a second aspect of the present disclosure includes a transceiver configured to receive, from a gateway device storing temporarily allocated identification information allocated to a communication terminal and an eDRX parameter associated with the communication terminal, a notification message with the temporarily allocated identification information and the eDRX parameter set therein; and a calculator configured to determine a timing at which a paging message is to be transmitted to a base station by the use of the temporarily allocated identification information and the eDRX parameter.

A base station according to a third aspect of the present disclosure includes a transceiver configured to receive, from a mobility management device, an eDRX parameter associated with a communication terminal, a GUTI temporarily allocated to a communication terminal or an S-TMSI included in the GUTI serving as temporarily allocated identification information, and an IMSI serving as identification information of the communication terminal; and a calculator configured to calculate a timing at which the communication terminal is to be paged by the use of the temporarily allocated identification information and the eDRX parameter, wherein the transceiver carries out paging by the use of the IMSI at the timing calculated by the calculator.

A communication method according to a fourth aspect of the present disclosure includes storing temporarily allocated identification information allocated to a communication terminal and an eDRX parameter associated with the communication terminal; and transmitting, in a case in which downlink data destined for a communication terminal managed by a mobility management device is received after a failure has occurred in the mobility management device, a notification message with the temporarily allocated identification information and the eDRX parameter set therein to the mobility management device or another mobility management device.

A control method according to a fifth aspect of the present disclosure includes receiving, from a gateway device storing temporarily allocated identification information allocated to a communication terminal and an eDRX parameter associated with the communication terminal, a notification message with the temporarily allocated identification information and the eDRX parameter set therein; and determining a timing at which a paging message is to be transmitted to a base station by the use of the temporarily allocated identification information and the eDRX parameter.

A paging method according to a sixth aspect of the present disclosure includes receiving, from a mobility management device, an eDRX parameter associated with a communication terminal, a GUTI temporarily allocated to a communication terminal or an S-TMSI included in the GUTI serving as temporarily allocated identification information, and an IMSI serving as identification information of the communication terminal; calculating a timing at which the communication terminal is to be paged by the use of the temporarily allocated identification information and the eDRX parameter; and paging by the use of the IMSI at the calculated timing.

A program according to a seventh aspect of the present disclosure causes a computer to execute: storing temporarily allocated identification information allocated to a communication terminal and an eDRX parameter associated with the communication terminal; and transmitting, in a case in which downlink data destined for a communication terminal managed by a mobility management device is received after a failure has occurred in the mobility management device, a notification message with the temporarily allocated identification information and the eDRX parameter set therein to the mobility management device or another mobility management device.

Advantageous Effects of Invention

The present disclosure can provide a gateway device, a mobility management device, a base station, a communication method, a control method, a paging method, and a program that make it possible to properly page a communication terminal (e.g., UE) managed by a control device (e.g., MME) even in a case in which the control device loses information on the communication terminal when the control device recovers from a failure that has occurred therein.

BRIEF DESCRIPTION OF THE DRAWINGS

FIG. 10 illustrates information set in a paging message according to the third embodiment;

DESCRIPTION OF EMBODIMENTS

First Embodiment

Figure 1:
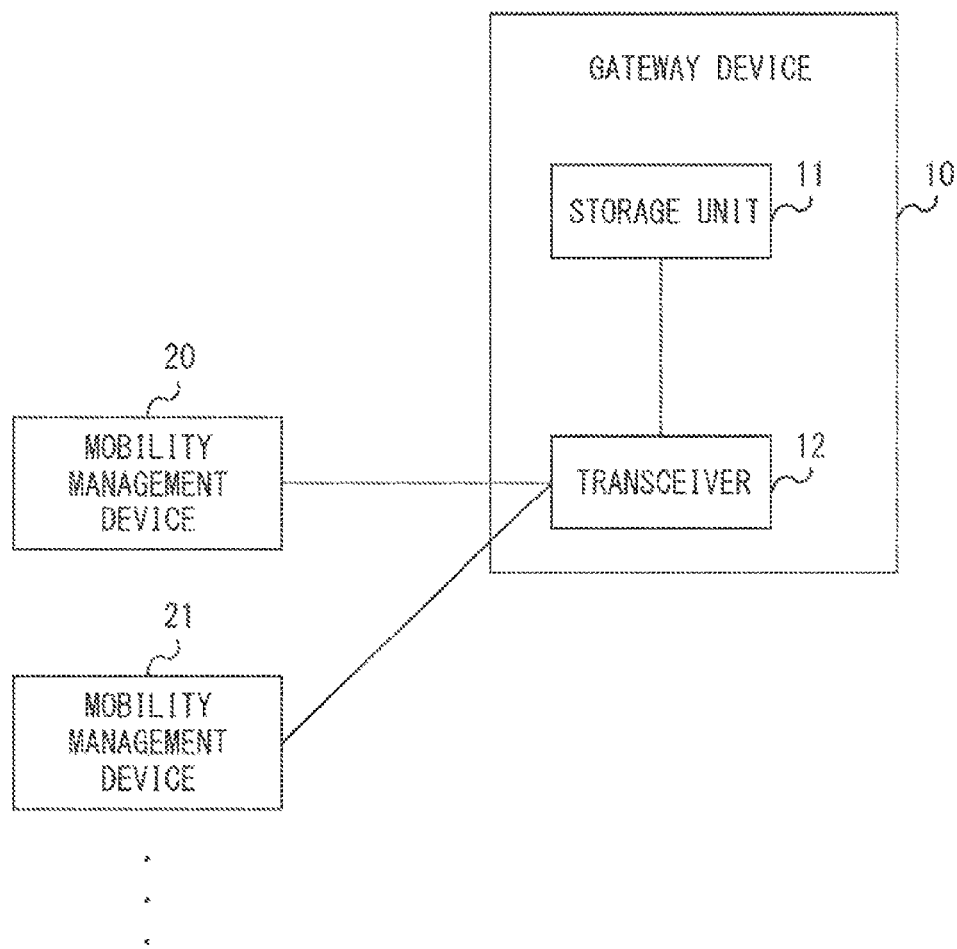
FIG. 1 is a configuration diagram of a gateway device according to a first embodiment.

Hereinafter, embodiments of the present disclosure will be described with reference to the drawings. With reference to FIG. 1, a configuration example of a gateway device 10 according to a first embodiment will be described. The gateway device 10 may be a computer device that operates as a processor executes a program stored in a memory. The gateway device 10 may be an SGW or a Gateway General Packet Radio Service (GPRS) Support Node (GGSN) defined in 3GPP.

The gateway device 10 includes a storage unit 11 and a transceiver 12. The storage unit 11 and the transceiver 12 may be software or a module that is processed as a processor executes a program stored in a memory. Alternatively, the storage unit 11 and the transceiver 12 may be hardware, such as a circuit or a chip. The transceiver may be a transmitter and a receiver.

The storage unit 11 stores temporarily allocated identification information that is temporarily allocated to a communication terminal and an eDRX parameter associated with the communication terminal. The communication terminal may be a mobile phone terminal, a smartphone terminal, or a tablet terminal. Alternatively, the communication terminal may be an Internet of Things (IoT) device used in an IoT service, a Machine to Machine (M2M) device, or a Machine Type Communication (MTC) device.

The temporarily allocated identification information may be, for example, the GUTI or may be the S-TMSI composed of the M-TMSI and the MMEC included in the GUTI. The eDRX parameter is information used when the communication terminal executes the eDRX function. The eDRX parameter may be, for example, a paging time window and an eDRX value. The gateway device 10 may, for example, acquire the temporarily allocated identification information and the eDRX parameter from an MME. The gateway device 10 may store the acquired temporarily allocated identification information and eDRX parameter into the storage unit 11.

The transceiver 12 communicates with a plurality of mobility management devices including mobility management devices 20 and 21. The mobility management device 20 may be, for example, an MME or a Serving GPRS Support Node (SGSN). Now, considered is a case in which, after a failure has occurred in the mobility management device 20, the gateway device 10 receives, via the transceiver 12, Downlink Data destined for a communication terminal managed by the mobility management device 20. The gateway device 10 can, for example, detect a failure that has occurred in the mobility management device 20 and its recovery from the failure on the basis of a health check procedure or the like carried out between the gateway device 10 and the mobility management device 20. The health check procedure may be carried out through transmission and reception of an echo request and an echo response defined in the GTP protocol. When the mobility management device 20 has recovered from a failure, the mobility management device 20 may have lost any information on the communication terminal that the mobility management device 20 was managing up to the failure. The information on the communication terminal may be the temporarily allocated identification information, the eDRX parameter, and so on. In addition, the information on the communication terminal may be the IMSI for identifying the communication terminal. In this case, the transceiver 12 of the gateway device 10 transmits, to the mobility management device 20 or the mobility management device 21 different from the mobility management device 20, a notification message in which the temporarily allocated identification information and the eDRX parameter associated with the communication terminal to which the Downlink Data is destined is set.

The notification message is used to notify the mobility management device 20 or the mobility management device 21 different from the mobility management device 20 that the Downlink Data destined for the communication terminal has been received. The transceiver 12 may transmit the notification message to the mobility management device 20 that has recovered from a failure or transmit the notification message to the mobility management device 21 different from the mobility management device 20.

Upon receiving the notification message, the mobility management device 20 or the mobility management device 21 can execute the Paging procedure for the communication terminal by the use of the temporarily allocated identification information and the eDRX parameter included in the notification message. In other words, the mobility management device 20 or the mobility management device 21 can calculate the timing at which paging is to be executed by the use of the S-TMSI included in the GUTI and the eDRX parameter. Meanwhile, the communication terminal calculates the timing for monitoring the paging channel by the use of the S-TMSI included in the GUTI transmitted during the TAU procedure and the eDRX parameter. This allows the timing at which the communication terminal executing the eDRX function monitors the paging channel to match the timing at which the mobility management device 20 executes the paging via a base station. Consequently, the communication terminal can properly process the paging destined for itself.

Second Embodiment

Figure 2:
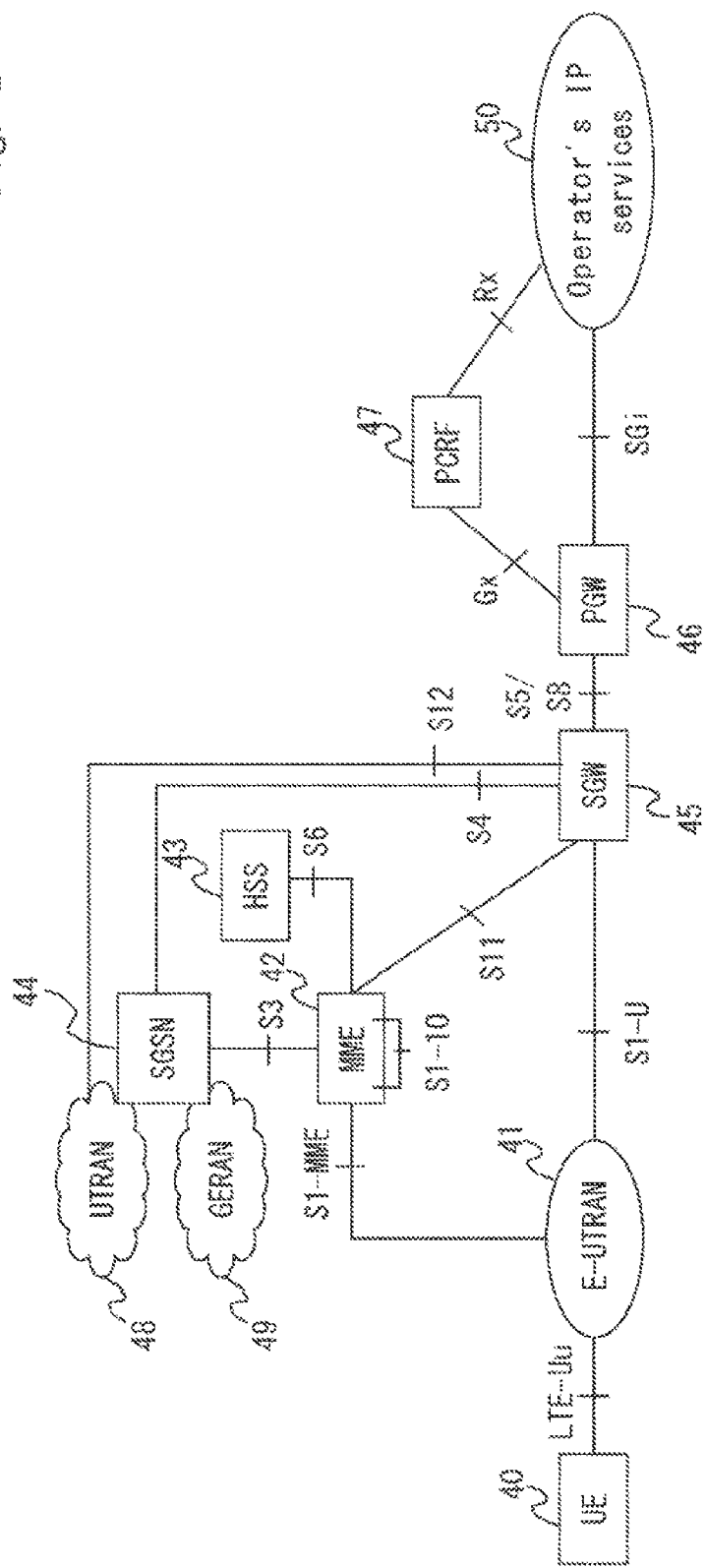
FIG. 2 is a configuration diagram of a communication system according to a second embodiment.

A configuration example of a communication system according to a second embodiment will now be described with reference to FIG. 2. A communication system illustrated in FIG. 2 supports Long Term Evolution (LTE) as a wireless communication scheme and includes a communication system defined as an Evolved Packet System (EPS) in 3GPP. FIG. 2 is based on a drawing in FIG. 4.2.1-1 of TS 23.401 V 13.8.0.

The communication system illustrated in FIG. 2 includes a UE 40, an Evolved-Universal Terrestrial Radio Access Network (E-UTRAN) 41, an MME 42, a Home Subscriber Server (HSS) 43, an SGSN 44, a Serving Gateway (SGW) 45, a Packet Data Network Gateway (PGW) 46, a Policy and Charging Rules Function (PCRF) entity 47 (hereinafter, referred to as PCRF 47), a UTRAN 48, a Global System for Mobile communications (GSM) (registered trademark) Enhanced Data Rates for Global Evolution (EDGE) Radio Access Network (GERAN) 49, and Operator's IP Services 50.

The MME 42 corresponds to the mobility management device 20 illustrated in FIG. 1. The SGW 45 corresponds to the gateway device 10 illustrated in FIG. 1. The SGSN 44 corresponds to the mobility management device 20 illustrated in FIG. 1. A GGSN corresponds to the gateway device 10 illustrated in FIG. 1.

The term UE is a collective term for communication terminals in 3GPP. A UE may be replaced by a Mobile Station (MS). The E-UTRAN 41 is a Radio Access Network (RAN) that uses LTE as a wireless access system, and the E-UTRAN 41 includes an eNB. The UTRAN 48 is a RAN that uses the 3G wireless scheme as a wireless access system, and the UTRAN 48 includes a NodeB. The GERAN 49 is a RAN that uses the 2G wireless scheme as a wireless access system.

The MME 42 and the SGSN 44 are nodes that execute mobility management, session management, and so on of the UE 40. The HSS 43 is a node that manages the subscriber information of the UE 40. The subscriber information may include information on services used by the UE 40. The SGW 45 and the PGW 46 are gateways that relay data transmitted between the UE 40 and the Operator's IP Services 50. The Operator's IP Services 50 may be, for example, a server device or server devices managed by a service provider or the like that provides the service to the UE 40. In addition, the Operator's IP Services 50 may be a server device that provides connection to the internet. The PCRF 47 is a node that manages policies, charging rules, and so on.

An LTE-Uu reference point is defined between the UE 40 and the E-UTRAN 41. An S1-MME reference point is defined between the E-UTRAN 41 and the MME 42. An S6 reference point is defined between the MME 42 and the HSS 43. An S3 reference point is defined between the MME 42 and the SGSN 44. An S1-U reference point is defined between the E-UTRAN 41 and the SGW 45. An S11 reference point is defined between the MME 42 and the SGW 45. An S4 reference point is defined between the SGSN 44 and the SGW 45. An S12 reference point is defined between the SGW 45 and the UTRAN 48. An S5/S8 reference point is defined between the SGW 45 and the PGW 46. A Gx reference point is defined between the PGW 46 and the PCRF 47. An SGi reference point is defined between the PGW 46 and the Operator's IP Services 50. An Rx reference point is defined between the PCRF 47 and the Operator's IP Services 50. An S1-10 reference point is defined between the MME 42 and another MME.

Figure 3:
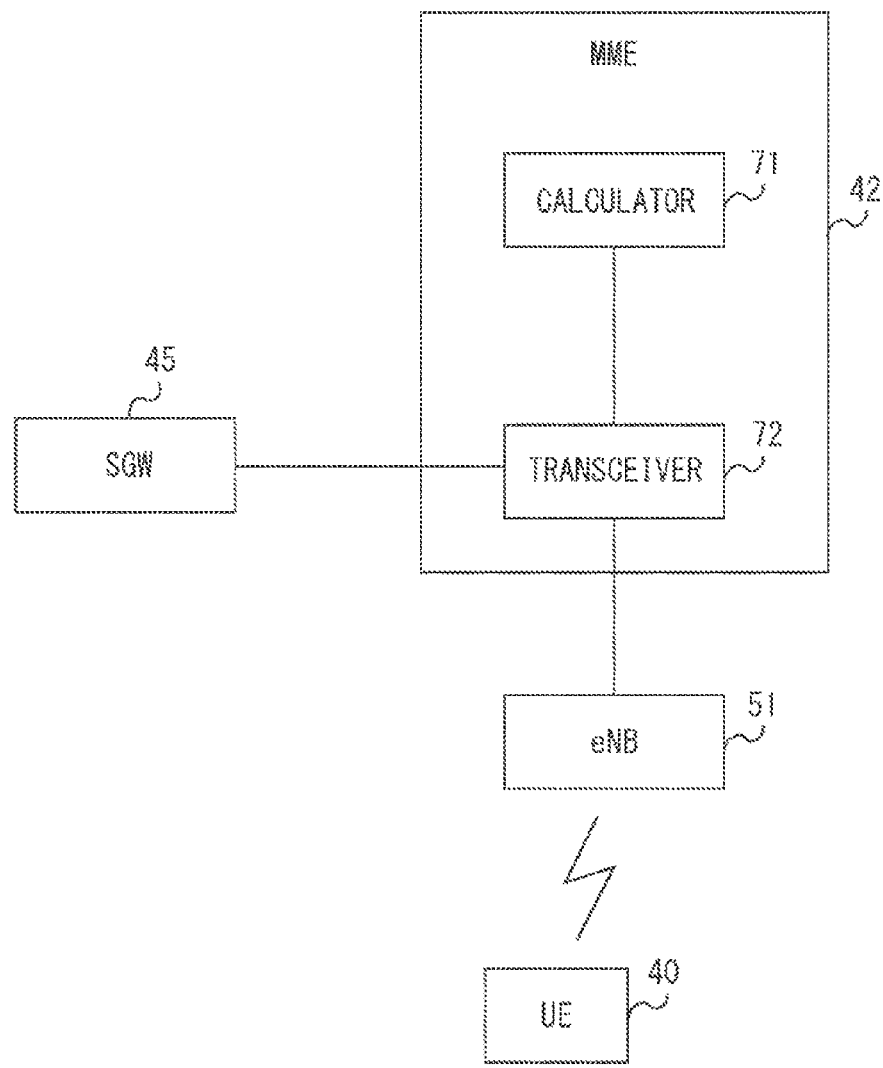
FIG. 3 is a configuration diagram of an MME according to the second embodiment.

A configuration example of the MME 42 according to the second embodiment will now be described with reference to FIG. 3. The MME 42 includes a calculator 71 and a transceiver 72. The calculator 71 and the transceiver 72 may be software or a module that is processed as a processor executes a program stored in a memory. Alternatively, the calculator 71 and the transceiver 72 may be hardware, such as a chip or a circuit. The transceiver may be a transmitter and a receiver.

The transceiver 72 transmits, to the SGW 45, the GUTI allocated to the UE 40 or the S-TMSI included in the GUTI and the eDRX parameter associated with the UE 40. The timing at which the transceiver 72 transmits the GUTI allocated to the UE 40 and so on to the SGW 45 will be described later in detail. The SGW 45 has a configuration similar to that of the gateway device 10 illustrated in FIG. 1. The MME 42 may acquire the eDRX parameter associated with the UE 40 from the UE 40. Furthermore, when the MME 42 recovers from a failure after the failure has occurred therein, the transceiver 72 receives, from the SGW 45, a Downlink Data Notification (DDN) message that includes the GUTI allocated to the UE 40 or the S-TMSI included in the GUTI and the eDRX parameter associated with the UE 40. The DDN message is a message used to notify the MME 42 that Downlink Data destined for the UE 40 has been transmitted to the SGW 45.

The MME 42 manages information on a plurality of UEs including the UE 40, or specifically, manages the subscriber data on the UEs. However, when the MME 42 recovers from a failure after the failure has occurred therein, the MME 42 will lose the information on the plurality of UEs.

When the MME 42 recovers from a failure, upon receiving the DDN message, the calculator 71 calculates the monitoring cycle of the paging channel in the UE 40 applying the eDRX function by the use of the S-TMSI and the eDRX parameter included in the received DDN message.

The transceiver 72 transmits a Paging message to an eNB 51 included in the E-UTRAN 41 to meet the monitoring cycle calculated by the calculator 71. The Paging message includes the GUTI allocated to the UE 40 or the S-TMSI included in the GUTI and the eDRX parameter associated with the UE 40.

Figure 4:
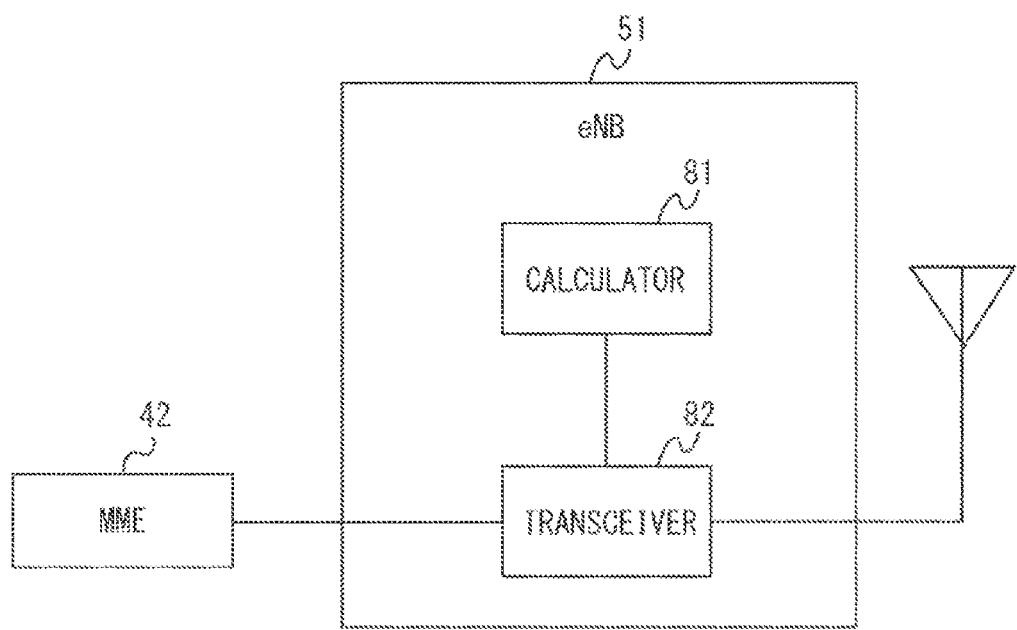
FIG. 4 is a configuration diagram of an eNB according to the second embodiment.

A configuration example of the eNB 51 according to the second embodiment will now be described with reference to FIG. 4. The eNB 51 includes a calculator 81 and a transceiver 82. The calculator 81 and the transceiver 82 may be software or a module that is processed as a processor executes a program stored in a memory. Alternatively, the calculator 81 and the transceiver 82 may be hardware, such as a chip or a circuit.

The transceiver 82 receives a Paging message from the MME 42. The Paging message includes the GUTI allocated to the UE 40 or the S-TMSI included in the GUTI and the eDRX parameter associated with the UE 40.

Upon receiving the Paging message, the calculator 81 calculates the monitoring cycle of the paging channel in the UE 40 applying the eDRX function by the use of the S-TMSI and the eDRX parameter.

The transceiver 72 pages the plurality of UEs including the UE 40 in accordance with the monitoring cycle calculated by the calculator 71.

Figure 5:
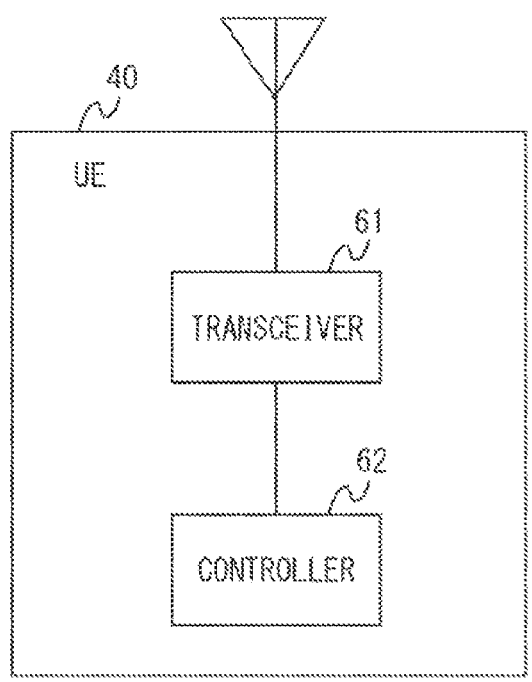
FIG. 5 is a configuration diagram of a UE according to the second embodiment.

A configuration example of the UE 40 according to the second embodiment will now be described with reference to FIG. 5. The UE 40 includes a transceiver 61 and a controller 62. The transceiver 61 and the controller 62 may be software or a module that is processed as a processor executes a program stored in a memory. Alternatively, the transceiver 61 and the controller 62 may be hardware, such as a chip or a circuit.

The controller 62 executes the eDRX function. For example, the controller 62 monitors whether the UE 40 is being paged via the transceiver 61 in accordance with an eDRX cycle. In other words, the controller 62 monitors the paging channel via the transceiver 61 in accordance with the eDRX cycle. If the controller 62 has determined that the UE 40 is being paged, the controller 62 transmits a response message to the eNB 51 via the transceiver 61. The transceiver 61 receives the GUTI from the MME 42 via the eNB 51 in the TAU procedure, in the Attach procedure, or at a desired timing. The controller 62 calculates the timing at which the paging channel is monitored by the use of the eDRX parameter and the S-TMSI included in the GUTI.

When the GUTI is updated in the MME 42, the controller 62 receives a new and updated GUTI from the MME 42 via the transceiver 61. The controller 62 calculates a new monitoring timing by the use of a new S-TMSI included in the received GUTI and the eDRX parameter. Since the timing at which the paging channel is monitored is determined on the basis of the S-TMSI and the eDRX parameter, when the S-TMSI is updated, the timing at which the paging channel is monitored is also changed.

A flow of the TAU procedure will now be described with reference to FIG. 6. First, the UE 40 transmits, to the eNB 51, an RRC message that includes a TAU Request message at a predetermined timing, at a timing at which the TA indicating the tracking area is changed, or the like (S11). The UE 40 herein is a terminal applying the eDRX. In this case, the TAU Request message transmitted by the UE 40 includes the eDRX parameter. Next, the eNB 51 transmits, to the MME 42, an S1-AP message that includes the TAU Request message transmitted from the UE 40 (S12).

The MME 42 executes the GUTI Reallocation Procedure (S13). Specifically, the MME 42 generates a new GUTI by updating the GUTI (old GUTI) currently allocated to the UE 40. For example, the MME 42 updates the M-TMSI included in the old GUTI.

The MME 42 transmits, to the eNB, an S1-AP message that includes a TAU Accept message including the new GUTI (S14). The TAU procedure executed in steps S12 to S14 is well-known, and thus detailed descriptions thereof will be omitted. Next, the eNB 51 transmits, to the UE 40, an RRC message that includes the TAU Accept message transmitted from the MME 42 (S15).

After transmitting, to the eNB 51, the S1-AP message that includes the TAU Accept message in S14, the MME 42 transmits a Modify Bearer Request message to the SGW 45 (S16). The Modify Bearer Request message transmitted by the MME 42 includes the new GUTI and the eDRX parameter associated with the UE 40. In addition, the MME 42 may transmit the Modify Bearer Request message to the SGW 45 after having executed the GUTI Reallocation Procedure in step S13 and before transmitting the TAU Accept message to the eNB 51 in step S14.

As the processes in steps S11 to S16 are executed, the SGW 45 can acquire the GUTI temporarily allocated to the UE 40 and the eDRX parameter associated with the UE 40. The Modify Bearer Request transmitted by the MME 42 in step S16 may include, in place of the new GUTI, the S-TMSI included in the new GUTI.

Figure 6:
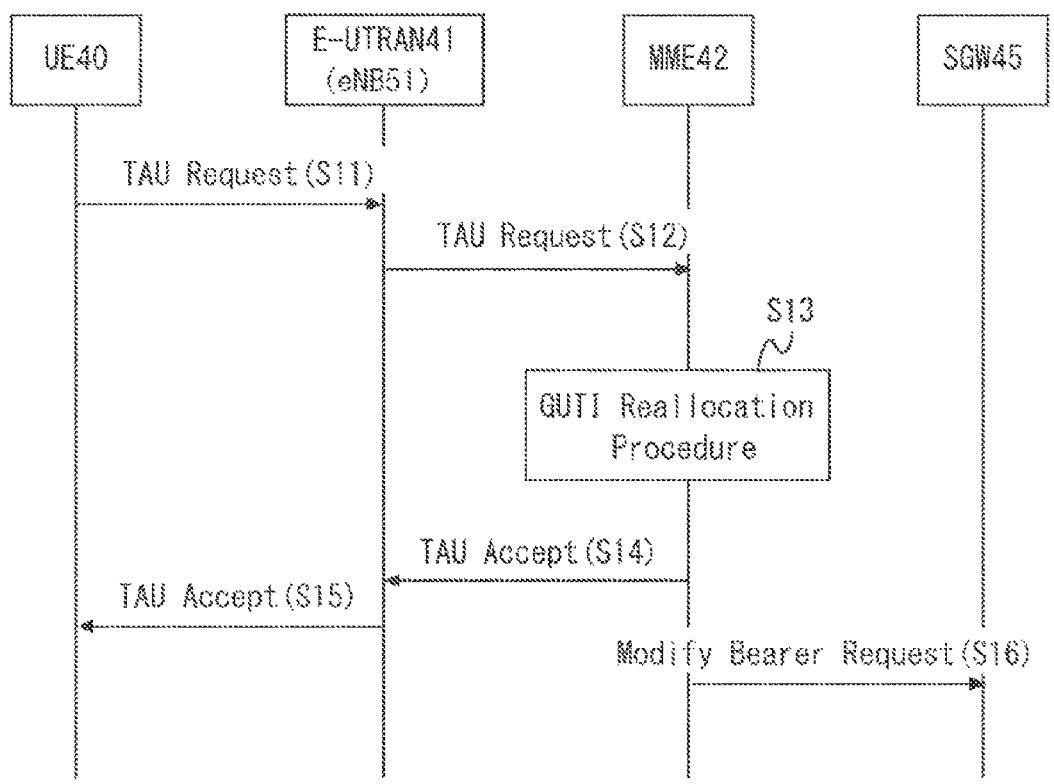
FIG. 6 illustrates a flow of a TAU procedure according to the second embodiment.

FIG. 6 shows that the GUTI and the eDRX parameter are transmitted to the SGW 45 in the TAU procedure. Alternatively, the GUTI or the S-TMSI included in the GUTI and the eDRX parameter may be transmitted to the SGW 45 in the Attach procedure, as in the TAU procedure. In the Attach procedure, in steps S11 and S12, an Attach Request message is used in place of the TAU Request message. In addition, in steps S14 and S15, an Attach Accept message is used in place of the TAU Accept message. Steps S13 and S16 are carried out similarly in the Attach procedure, as in the TAU procedure. In the Attach procedure, after step S13, the GUTI or the S-TMSI included in the GUTI and the eDRX parameter may be set in a Create Session Request message to be transmitted by the MME 42, and this Create Session Request message may be transmitted to the SGW 45. Alternatively, in a periodic location update (periodic TAU) as well, neither the Create Session Request nor the Modify Bearer Request is transmitted in a case in which the periodic location update is not carried out until S1 connection is restored (Active Flag=OFF) or in a TAU in which a changed TA is transmitted via Uplink NAS Transport for mere notification after moving while mainly S1 connection is available, that is, after a Handover procedure defined in Section 5.5 of Non Patent Literature 1 has occurred. Therefore, in these cases, the MME 42 may transmit the new GUTI and so on to the SGW 45 by the use of another message.

Figure 7:
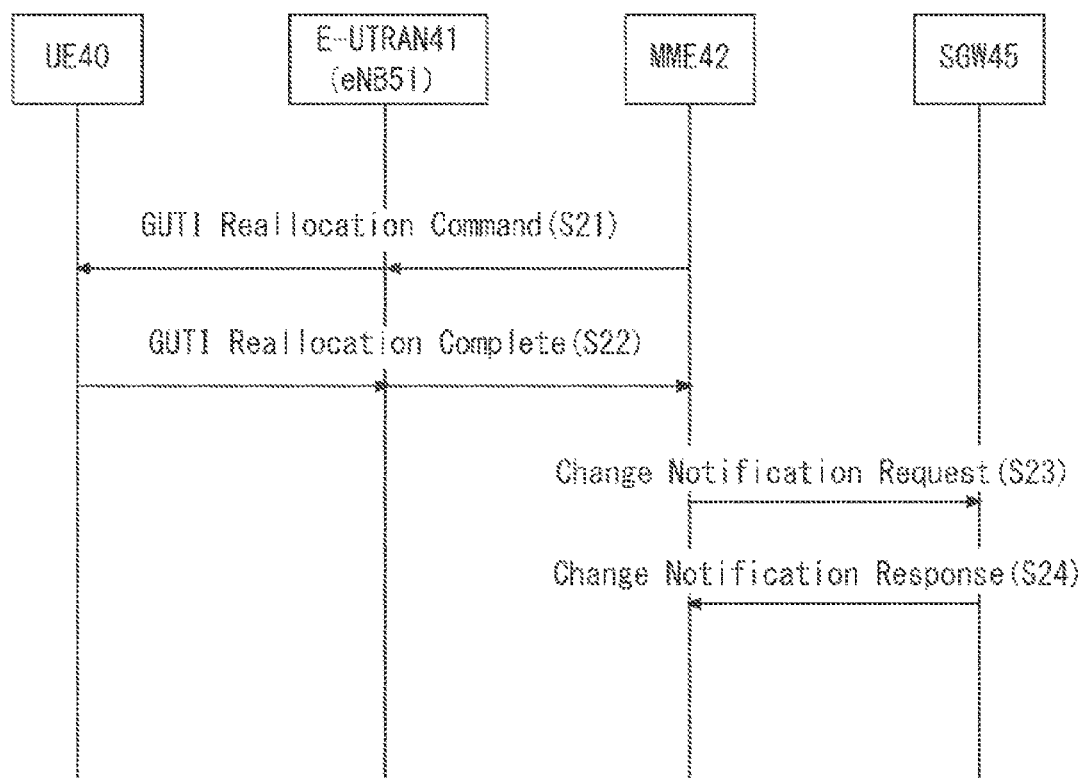
FIG. 7 illustrates a flow of a GUTI notification procedure according to the second embodiment.

A GUTI notification sequence according to the second embodiment will now be described with reference to FIG. 7. FIG. 7 shows that the MME 42 transmits an updated GUTI (new GUTI) to the UE 40 at a desired timing. The MME 42 transmits a GUTI Reallocation Command message to the UE 40 via the eNB 51 at a desired timing (S21). The GUTI Reallocation Command message includes the new GUTI. In response to the GUTI Reallocation Command message, the UE 40 transmits a GUTI Reallocation Complete message to the MME 42 via the eNB 51 (S22). The MME 42 then transmits a Change Notification Request message to the SGW 45 (S23). The Change Notification Request message transmitted by the MME 42 includes the new GUTI and the eDRX parameter associated with the UE 40.

In response to the Change Notification Request message, the SGW 45 transmits a Change Notification Response message to the MME 42 (S24).

As the processes in steps S21 to S24 are executed, the SGW 45 can acquire the GUTI temporarily allocated to the UE 40 and the eDRX parameter associated with the UE 40. The Change Notification Request message transmitted by the MME 42 in step S23 may include, in place of the new GUTI, the S-TMSI included in the new GUTI.

FIG. 7 illustrates an example in which the MME 42 transmits the new GUTI and the eDRX parameter associated with the UE 40 to the SGW 45 by the use of the Change Notification Request message. Alternatively, the MME 42 may transmit the new GUTI and so on to the SGW 45 by the use of another message.

FIGS. 6 and 7 illustrate examples in which the new GUTI and so on are transmitted to the SGW 45 in the TAU procedure, in the Attach procedure, and in the procedure for transmitting the GUTI at a desired timing. Alternatively, the MME 42 may transmit the new GUTI and so on to the SGW 45 in a procedure other than the above. Specific examples include the TAU that is not carried out until the S1 connection is restored (Active Flag=OFF) in the periodic location update (periodic TAU) and a case in which neither the Create Session Request nor the Modify Bearer Request is transmitted in a TAU in which a changed TA is transmitted via Uplink NAS Transport for mere notification after the UE has moved while S1 connection is available, that is, after a Handover procedure defined in Section 5.5 of Non Patent Literature 1 has occurred.

A flow of a packet receiving procedure according to the second embodiment will now be described with reference to FIG. 8. In this flow, a failure occurs in the MME 42 (S30), and then the MME 42 recovers from the failure that has occurred therein (S33). When the MME 42 recovers from a failure, the MME 42 will lose the information on a plurality of UEs including the UE 40 that the MME 42 has been managing up to the failure.

Meanwhile, the SGW 45 is notified of the GUTI of the UE managed by the MME 42 or the S-TMSI included in the GUTI and the eDRX parameter associated with the UE in the TAU procedure, in the Attach procedure, or in the GUTI Reallocation procedure carried out at a desired timing, and the SGW 45 manages the information that the SGW 45 has been notified of. Therefore, the SGW 45 retains a session connect state of a plurality of UEs including the UE 40 between the SGW 45 and the PGW 46 (S31). In addition, even after the SGW 45 detects a failure that has occurred in the MME 42 in step S31 (S32), the SGW 45 retains the session connect state of the UE managed by the MME 42 until the failure has occurred. The SGW 45 may detect a failure that has occurred in the MME 42 through a health check on the MME 42 or by the use of a Restart Counter received from the MME 42. The method of detecting a failure is not limited to the aforementioned methods.

In retaining the session connect state of the UE 40, for example, the SGW 45 may continue to hold the GUTI allocated to the UE 40 or the S-TMSI included in the GUTI, the eDRX parameter associated with the UE 40, and the IMSI for identifying the UE 40 that have been transmitted from the MME 42, as illustrated in FIGS. 6 and 7. Furthermore, in retaining the session connect state of the UE 40, the SGW 45 may continue to have the bearer associated with the UE 40 set between the SGW 45 and the PGW 46. The SGW 45 may determine that the MME 42 has recovered from a failure that has occurred therein through a health check on the MME 42 or by the use of the Restart Counter received from the MME 42 (S34). The method of detecting a failure is not limited to the aforementioned methods.

Upon receiving Downlink Data destined for the UE 40 from the Operator's IP Services 50 or the like, the PGW 46 transmits the Downlink Data to the SGW 45 (S35). Then, in order to notify the MME 42 that the Downlink Data destined for the UE 40 has been received, the SGW 45 transmits a DDN message to the MME 42 (S36). The DDN message transmitted by the SGW 45 includes the GUTI allocated to the UE 40 or the S-TMSI included in the GUTI, the eDRX parameter associated with the UE 40, and the IMSI for identifying the UE 40.

The MME 42 calculates the timing at which the UE 40 monitors the paging channel by the use of the S-TMSI and the eDRX parameter (S37). In other words, the MME 42 calculates the timing at which the UE 40 is to be paged by the use of the S-TMSI and the eDRX parameter.

In response to the DDN message, the MME 42 transmits a DDN Acknowledge (Ack) message to the SGW 45 (S38). The MME 42 then checks whether the GUTI included in the DDN message (S36) is already distributed to another UE in the process of S37. Upon confirming that the GUTI included in the DDN message (S36) has not been distributed to any UE, the MME 42 transmits a Paging message to the eNB 51 to meet the timing at which the UE 40 is to be paged as calculated in step S37 (S39). The Paging message transmitted by the MME 42 includes the GUTI allocated to the UE 40 or the S-TMSI included in the GUTI and the eDRX parameter associated with the UE 40. The Paging message (S39) may further include the IMSI. Meanwhile, if the GUTI included in the DDN message (S36) is already distributed to another UE in the process of S37, the Paging message (S39) transmitted by the MME 42 includes, in addition to the GUTI allocated to the UE 40 or the S-TMSI included in the GUTI and the eDRX parameter associated with the UE 40, the IMSI for identifying the UE 40.

The eNB 51 pages the UE 40 at the paging timing calculated by the use of the S-TMSI and the eDRX parameter associated with the UE 40 (S40). Upon detecting the paging channel destined for the UE 40 including the GUTI allocated to the UE 40, the UE 40 executes a Service Request Procedure (S41).

As described thus far, the use of the communication system according to the second embodiment allows the SGW 45 to acquire the GUTI allocated to the UE 40 or the S-TMSI included in the GUTI and the eDRX parameter. When the MME 42 recovers from a failure after the failure has occurred therein, the MME 42 will lose the information on the UE 40. Even in such a case, when the SGW 45 receives Downlink Data destined for the UE 40, the SGW 45 can transmit, to the MME 42, the GUTI allocated to the UE 40 or the S-TMSI included in the GUTI and the eDRX parameter.

The MME 42 and the eNB 51 can calculate the timing at which the paging channel monitored by the UE 40 is to be monitored by the use of the S-TMSI and the eDRX parameter transmitted from the SGW 45. Consequently, even when the MME 42 has lost the information on the UE 40, the UE 40 can be properly paged.

Figure 8:
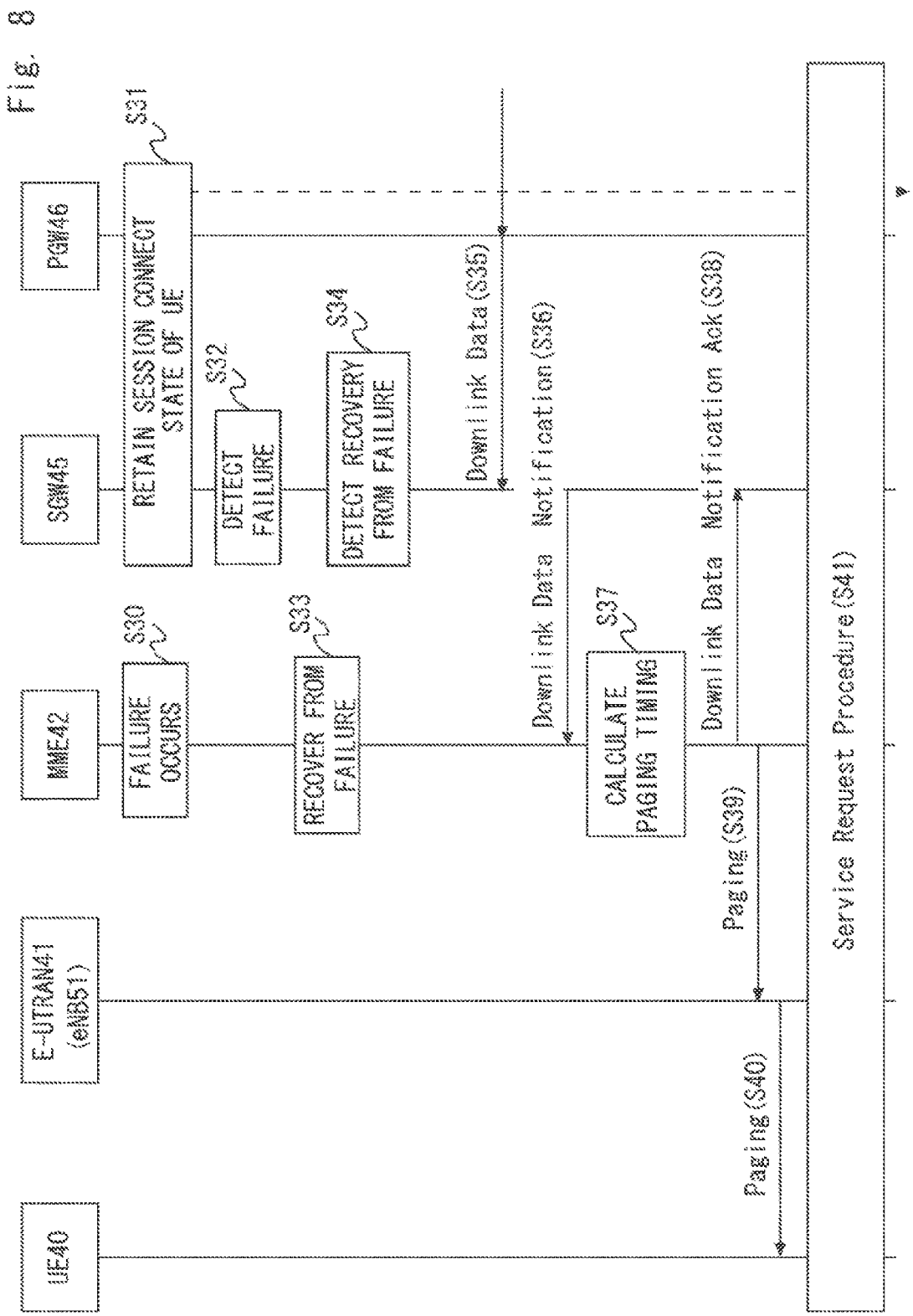
FIG. 8 illustrates a flow of a packet receiving procedure according to the second embodiment.

In FIG. 8, the SGW 45 transmits the DDN message to the MME 42 that has recovered from a failure. Alternatively, the SGW 45 may transmit the DDN message to another MME different from the MME 42. This may occur, for example, when the SGW 45 receives the Downlink Data (S35) before the MME 42 recovers from a failure (prior to S34). Another MME may be, specifically, an MME within an MME pool including the MME 42. The MME pool is a technique that enhances fault tolerance of MMEs as a plurality of MMEs are connected to an eNB. Another MME within the MME pool does not manage the information on the UE managed by the MME 42. Like the MME 42 illustrated in FIG. 8, the other MME, upon receiving the DDN message transmitted from the SGW 45, calculates the cycle on which the UE 40 monitors the paging channel by the use of the S-TMSI and the eDRX parameter associated with the UE 40. In other words, the other MME executes the processes similar to those in step S37 and thereafter of FIG. 8. In this case, the Paging message transmitted by the other MME includes the GUTI allocated to the UE 40 or the S-TMSI included in the GUTI, the eDRX parameter associated with the UE 40, and the IMSI for identifying the UE 40.

Third Embodiment

A flow of a packet receiving procedure according to a third embodiment will now be described with reference to FIG. 9. The flow of the processes in steps S30 to S40 of FIG. 9 is similar to the flow of the processes in steps S30 to S40 of FIG. 8, and thus the same reference characters as those in FIG. 8 will be given for description.

Figure 9:
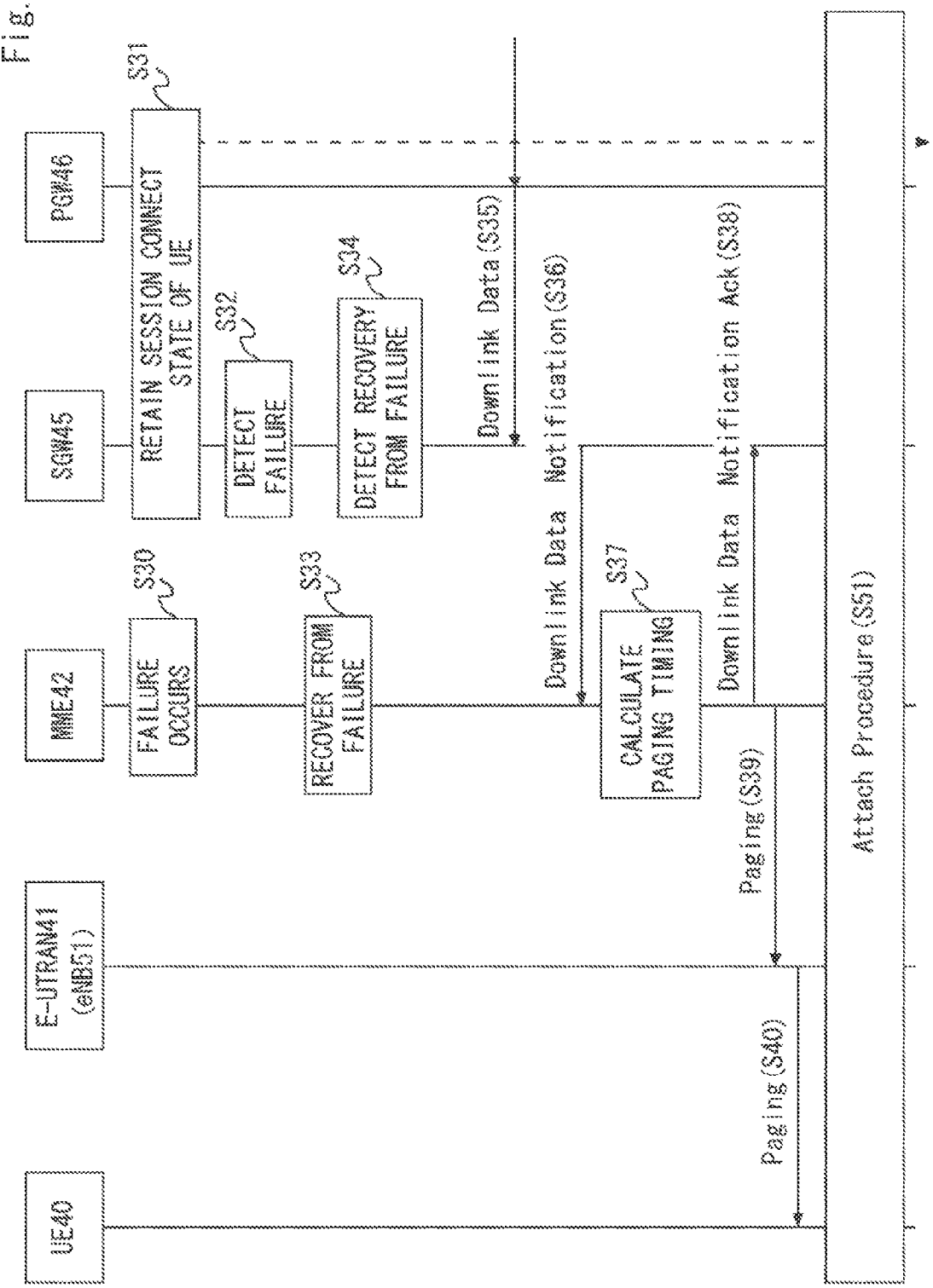
FIG. 9 illustrates a flow of a packet receiving procedure according to a third embodiment.

A Paging procedure illustrated in FIG. 9 differs from the Paging procedure illustrated in FIG. 8 in terms of a parameter set in a message transmitted in step S39 and thereafter.

The Paging message transmitted in step S39 of FIG. 9 includes the IMSI for identifying the UE 40, in addition to the GUTI allocated to the UE 40 or the S-TMSI included in the GUTI and the eDRX parameter associated with the UE 40, which are included in the Paging message illustrated in FIG. 8.

Now, information elements set in the Paging message will be described with reference to FIG. 10. FIG. 10 shows that two UE paging identities—UE Paging Identity and UE Paging Identity2—are set as the information elements set in the Paging message. For example, the S-TMSI associated with the UE 40 may be set in the UE Paging Identity, and the IMSI associated with the UE 40 may be set in the UE Paging Identity2. The name "UE Paging Identity2" is not a limiting example, and another name may instead be used.

Referring back to FIG. 9, in step S40 of FIG. 9, the eNB 51 pages the UE 40 at the paging timing calculated by the use of the S-TMSI and the eDRX parameter associated with the UE 40. In step S40 of FIG. 9, the eNB 51 executes the paging by the use of the IMSI as the identification information of the UE 40. Upon detecting the paging channel destined for the UE 40 including the IMSI indicating the UE 40, the UE 40 executes the Attach Procedure (S51). Even when the GUTI included in the DDN message (S36) is already distributed to another UE, as illustrated in FIG. 8, or even when another MME executes the Paging message (S39), in a similar manner, the eNB 51 executes the paging by the use of the IMSI as the identification information of the UE 40 at the paging timing calculated by the use of the S-TMSI and the eDRX parameter associated with the UE 40.

The paging in which the IMSI is used as the identification information of the UE 40 is typically executed in a state in which the MME 42 has no information on the UE 40 after the MME has recovered from a failure. Therefore, upon detecting the paging channel that includes the IMSI indicating the UE 40, the UE 40 executes the Attach procedure in order to register the information on the UE 40 into the MME 42.

Hereinafter, advantageous effects of the Paging procedure illustrated in FIG. 9 in comparison to the Paging procedure illustrated in FIG. 8 will be described. In FIG. 8, the paging in which the GUTI is used as the identification information of the UE 40 is executed in a state in which the information on the UE 40 managed by the MME 42 is lost after the MME 42 has recovered from a failure. Therefore, the UE 40 executes the Service Request Procedure on the premise that the information on the UE 40 is being managed by the MME 42.

However, since the MME 42 has lost the information on the UE 40, the MME 42 cannot continue with the Service Request Procedure. Consequently, the MME 42 transmits a Reject message to the UE 40 that has transmitted a Service Request message to the MME 42. Upon receiving the Reject message, the UE 40 registers the information on the UE 40 into the MME 42 by carrying out the Attach Procedure.

In contrast, the IMSI is used as the identification information of the UE 40 in the Paging procedure illustrated in FIG. 9. Although the GUTI or the S-TMSI is also set in the Paging message in step S39 of FIG. 9, the GUTI or the S-TMSI is used merely to calculate the timing at which the paging is executed. In other words, in step S40 of FIG. 9, the information set in the paging channel for identifying the UE 40 is the IMSI of the UE 40. When the Paging message transmitted by the MME 42 includes the GUTI and the IMSI, the eNB 51 may preferentially carry out the paging by the use of the IMSI.

Upon detecting the paging channel that includes the IMSI indicating the UE 40, the UE 40 can execute the Attach Procedure without executing the Service Request Procedure. Therefore, the Paging procedure illustrated in FIG. 9 provides an advantageous effect of reducing the processing load associated with the Service Request Procedure, as compared to the Paging procedure illustrated in FIG. 8, since the Service Request Procedure is not executed.

Fourth Embodiment

Figure 11:
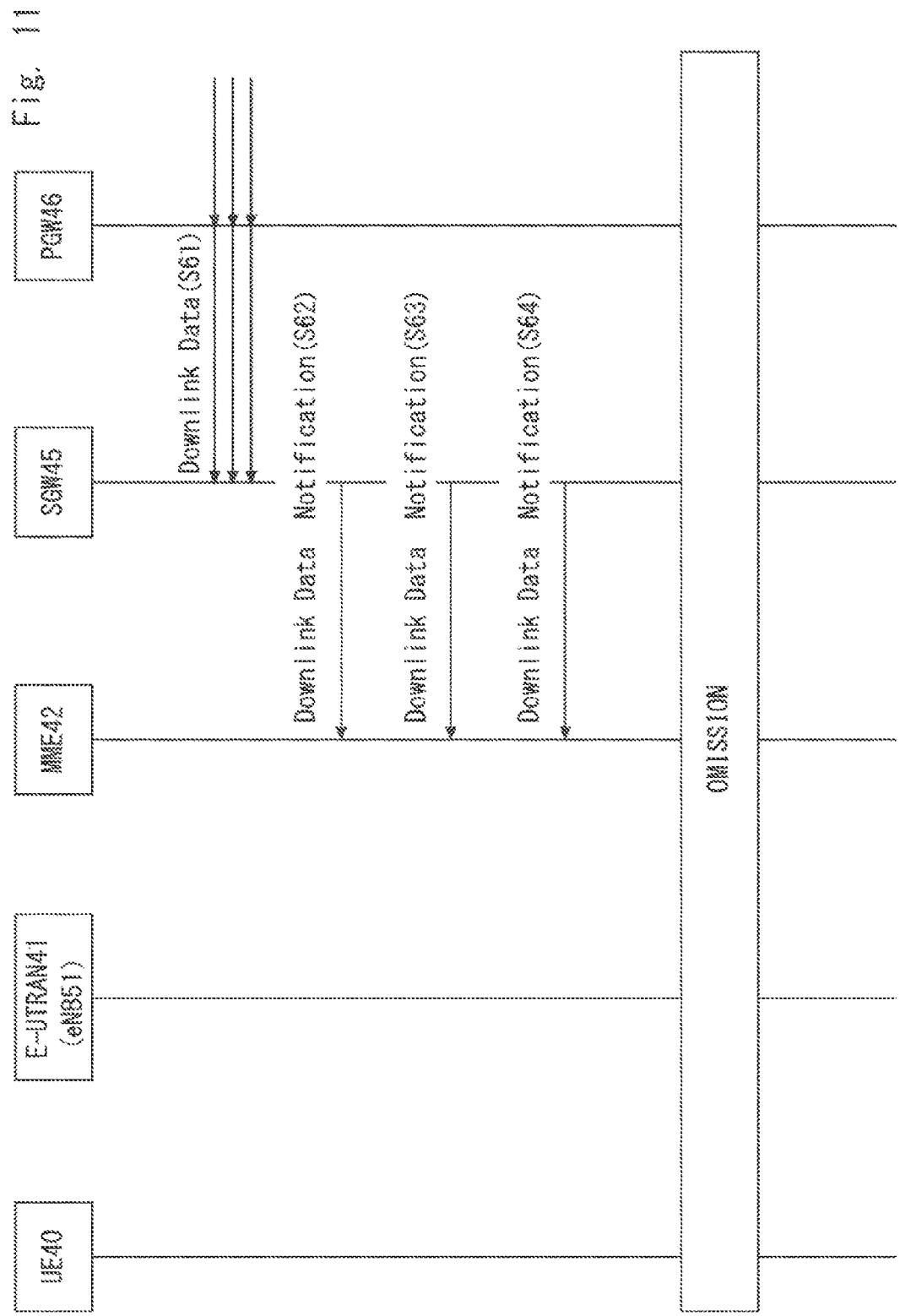
FIG. 11 illustrates a flow of a packet receiving procedure according to a fourth embodiment.

A flow of a packet receiving procedure according to a fourth embodiment will now be described with reference to FIG. 11. In FIG. 11, those events in steps S31 to S34 of FIG. 8 have occurred. In addition, in FIG. 11, the SGW 45 receives, all at once, a large amount of Downlink Data destined for the UEs managed by the MME 42 after the MME 42 recovers from a failure (S61).

When a large number of DDN messages are transmitted all at once to the MME 42 as the SGW 45 receives a large amount of Downlink Data all at once, the processing load in the MME 42 increases rapidly, which may bring the MME 42 back into a failure state. In order to prevent such a situation, even when the SGW 45 has received a large amount of Downlink Data all at once, the SGW 45 gradually transmits the DDN messages to the MME 42 (S62 to S64).

For example, when the SGW 45 has newly received a predetermined number of pieces or more of Downlink Data within a predetermined period, the SGW 45 may gradually transmit the DDN messages to the MME 42. When the SGW 45 gradually transmits the DDN messages to the MME 42, the interval at which the DDN messages are transmitted may be held to a predetermined duration or longer to an extent that does not rapidly increase the processing load in the MME 42. For example, when the SGW 45 has newly received a predetermined number of pieces or more of Downlink Data within a predetermined period, the SGW 45 may determine the interval at which the DDN messages are transmitted by the use of a preset timer. An operation held when the SGW 45 has received a large amount of Downlink Data all at once has been described above. This operation can be applied in a similar manner even in a case in which the SGW 45 has already buffered the Downlink Data destined for the UEs when the MME 42 has recovered from a failure. In this case, the Downlink Data Notification messages (S62, S63, and S64) illustrated in FIG. 11 are not triggered by the reception of the Downlink Data (S61) but are initiated by the SGW 45.

In the future, when there is a drastic increase in the number of IoT devices equipped with the eDRX function and more IoT devices are managed by the MME 42, it is conceivable that the Downlink Data is transmitted all at once to the UEs managed by the MME 42 that has recovered from a failure. Even in such a case, as the SGW 45 controls the interval at which the DDN messages are transmitted, a rapid increase in the processing load of the MME 42 can be prevented.

Fifth Embodiment

Now, a duration for which the session connect state of the UE is retained between the SGW 45 and the PGW 46 according to a fifth embodiment will be described. The UE 40 periodically executes the TAU procedure even if its TA is not changed. The TAU procedure periodically executed may be referred to as a periodic location update or a periodic TAU. The interval at which the UE 40 executes the periodic location update is determined on the basis of a T3412 timer defined in 3GPP. For example, the maximum interval at which the UE 40 executes the periodic location update is determined to be approximately 186 minutes at the maximum on the basis of the T3412 timer.

In order to save power of the UE 40 and to reduce the network load, the interval at which the periodic location update is executed is extended. To this end, a T3412 extended value is defined in 3GPP. The maximum interval at which the UE 40 executes the periodic location update is extended to approximately 413 days at the maximum on the basis of the T3412 extended value. The periodic location update that is based on the T3412 extended value is considered to be applied mainly to IoT devices.

In the fifth embodiment, the SGW 45 determines the duration for which the session connect state of the UE is retained in step S32 of FIGS. 8 and 9 on the basis of the T3412 timer or the T3412 extended value.

Specifically, in the TAU procedure or the Attach procedure illustrated in FIG. 6, the MME 42 sets the T3412 timer or the T3412 extended value in the TAU Accept message or the Attach Accept message in order to notify the UE 40 of the cycle of the periodic location update. Furthermore, the MME 42 sets the T3412 timer or the T3412 extended value set in the TAU Accept message or the Attach Accept message into the Modify Bearer Request message or the Create Session Request message.

When the SGW 45 has received the Modify Bearer Request message or the Create Session Request message with the T3412 timer set therein, the SGW 45, for example, retains the session connect state of the UE for the duration equal to the interval of the periodic location update determined on the basis of the T3412 timer, after having detected a failure in the MME 42 in step S33 of FIGS. 8 and 9. In addition, when the SGW 45 has received the Modify Bearer Request message or the Create Session Request message with the T3412 extended value set therein, the SGW 45, for example, retains the session connect state of the UE for the duration equal to the interval of the periodic location update determined on the basis of the T3412 extended value, after having detected a failure in the MME 42 in step S33 of FIGS. 8 and 9. Determining the duration for which the session connect state of the UE is retained in this manner provides the following advantageous effects.

The SGW 45 cannot confirm the interval of the periodic location update of the UE 40 unless the SGW 45 receives the Modify Bearer Request message with the T3412 timer or the T3412 extended value set therein. Therefore, it is conceivable, for example, that the SGW 45 determines to retain the session connect state of the UE for the duration equal to the interval of the periodic location update determined uniformly on the basis of the T3412 timer. In this case, however, if the interval of the periodic location update of the UE 40 is defined on the basis of the T3412 extended value, the SGW 45 cannot transmit, to the MME 42, the DDN message associated with the Downlink Data received after the session connect state of the UE 40 has been released. This is because the SGW 45 loses the GUTI, the IMSI, and so on associated with the UE 40 when the session connect state of the UE 40 is released and thus cannot set the identification information of the UE 40 into the DDN message.

It is also conceivable that the SGW 45 determines to retain the session connect state of the UE for the duration equal to the interval of the periodic location update determined uniformly on the basis of the T3412 extended value. Considered now is a case in which the UE 40 is in an uncommunicable state in which the UE 40 cannot even notify the eNB that the UE 40 has entered a powered-off state for such reasons as a mechanical problem in the UE 40 or the UE 40 entering a powered-off state from a powered-on state at a location that is outside the service range. In such a case, if the SGW 45 retains the session connect state of the UE for the duration equal to the interval of the periodic location update determined on the basis of the T3412 timer, the session connect state of the UE 40 can be resolved in approximately 186 minutes at the maximum. However, if the SGW 45 retains the session connect state of the UE for the duration equal to the interval of the periodic location update determined uniformly on the basis of the T3412 extended value, the session connect state of the UE that is not capable of communication needs to be retained for as long as 413 days at the maximum.

In this manner, if the SGW 45 determines to retain the session connect state of the UE without realizing which one of the T3412 timer and the T3412 extended value the determination of the interval of the periodic location update of the UE 40 is based on, the foregoing problem arises.

In contrast, in the fifth embodiment, the SGW 45 can receive the Modify Bearer Request message or the Create Session Request message with either one of the T3412 timer and the T3412 extended value set therein. Therefore, the SGW 45 can recognize which one of the T3412 timer and the T3412 extended value the determination of the interval of the periodic location update of the UE 40 is based on. Accordingly, the SGW 45 can determine the duration for which the session connect state is retained on a UE by UE basis. Thus, it is possible to prevent a situation in which the DDN message cannot be transmitted to the MME 42 as the session connect state is resolved and a situation in which the session connect state of the UE that is not capable of communication is retained for an extended period of time.

Figure 12:
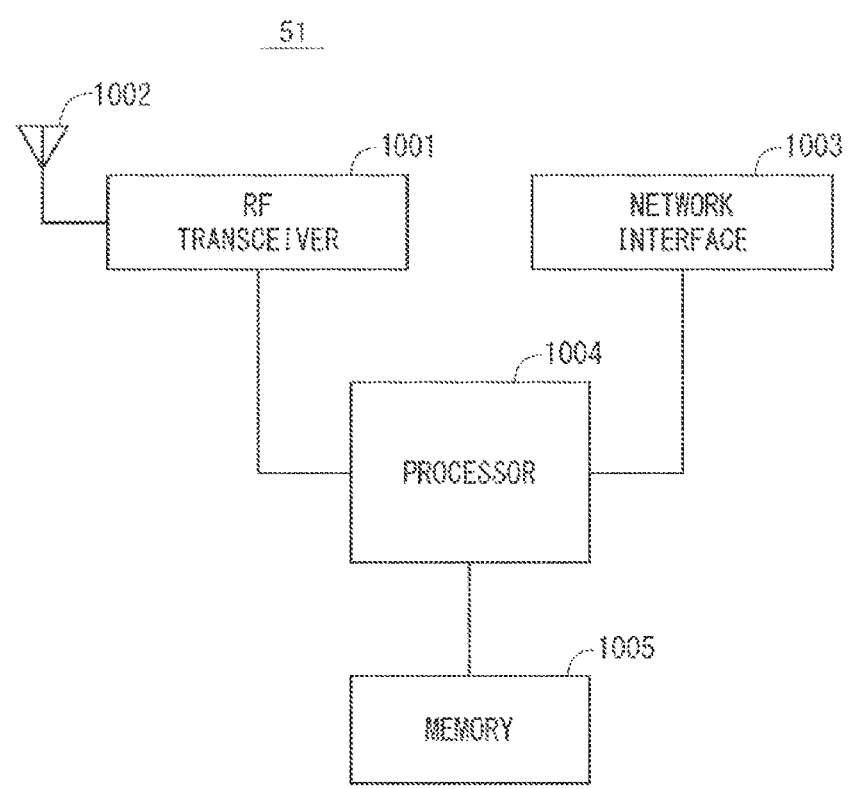
FIG. 12 is a configuration diagram of an eNB according to each embodiment.

Hereinafter, configuration examples of the eNB 51, the UE 40, the MME 42, and the SGW 45 described in the foregoing embodiments will be described. FIG. 12 is a block diagram illustrating a configuration example of the eNB 51. With reference to FIG. 12, the eNB 51 includes an RF transceiver 1001, a network interface 1003, a processor 1004, and a memory 1005. The RF transceiver 1001 carries out analog RF signal processing to communicate with UEs. The RF transceiver 1001 may include a plurality of transceivers. The RF transceiver 1001 is coupled to an antenna 1002 and the processor 1004. The RF transceiver 1001 receives modulation symbol data (or OFDM symbol data) from the processor 1004, generates a transmission RF signal, and supplies the transmission RF signal to the antenna 1002. In addition, the RF transceiver 1001 generates a baseband reception signal on the basis of a reception RF signal received via the antenna 1002 and supplies the baseband reception signal to the processor 1004.

The network interface 1003 is used to communicate with a network node (e.g., another core network node). The network interface 1003 may include, for example, a network interface card (NIC) compliant with IEEE 802.3 series.

The processor 1004 carries out data plane processing and control plane processing including digital baseband signal processing for wireless communication. For example, in the case of LTE and LTE-Advanced, the digital baseband signal processing carried out by the processor 1004 may include MAC layer and PHY layer signal processing.

The processor 1004 may include a plurality of processors. For example, the processor 1004 may include a modem processor (e.g., DSP) that carries out the digital baseband signal processing and a protocol stack processor (e.g., CPU or MPU) that carries out the control plane processing.

The memory 1005 is constituted by a combination of a volatile memory and a non-volatile memory. The memory 1005 may include a plurality of memory devices that are physically independent of each other. The volatile memory is, for example, a static random-access memory (SRAM), a dynamic RAM (DRAM), or a combination thereof. The non-volatile memory is a mask read-only memory (MROM), an electrically erasable programmable ROM (EEPROM), a flash memory, a hard disk drive, or a desired combination thereof. The memory 1005 may include a storage disposed away from the processor 1004. In this case, the processor 1004 may access the memory 1005 via the network interface 1003 or an I/O interface (not illustrated).

The memory 1005 may store a software module (computer program) that includes a set of instructions and data for implementing the processing carried out by the eNB 51 described in the foregoing embodiments. In some implementations, the processor 1004 may be configured to carry out the processing of the eNB 51 described in the foregoing embodiments by reading out the software module from the memory 1005 and executing the software module.

Figure 13:
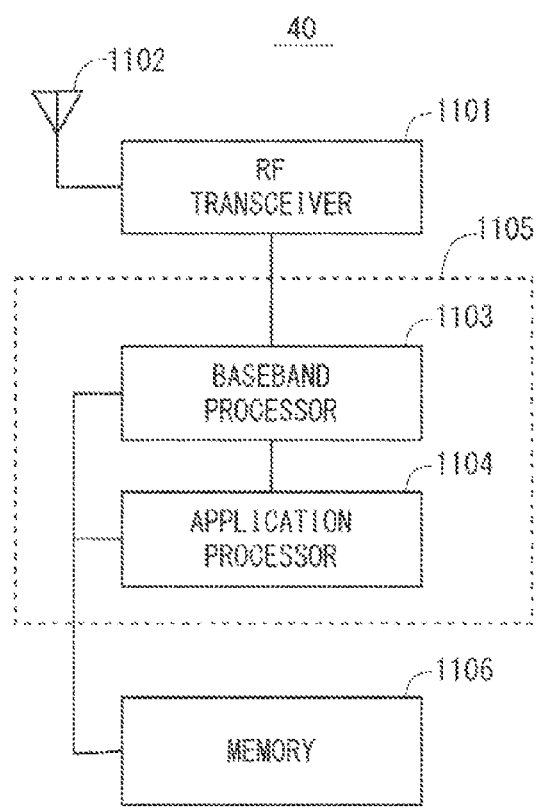
FIG. 13 is a configuration diagram of a UE according to each embodiment.

FIG. 13 is a block diagram illustrating a configuration example of the UE 40. A Radio Frequency (RF) transceiver 1101 carries out analog RF signal processing to communicate with the eNB 51. The analog RF signal processing carried out by the RF transceiver 1101 includes frequency upconversion, frequency downconversion, and amplification. The RF transceiver 1101 is coupled to an antenna 1102 and a baseband processor 1103. Specifically, the RF transceiver 1101 receives modulation symbol data (or OFDM symbol data) from the baseband processor 1103, generates a transmission RF signal, and supplies the transmission RF signal to the antenna 1102. In addition, the RF transceiver 1101 generates a baseband reception signal on the basis of a reception RF signal received via the antenna 1102 and supplies the baseband reception signal to the baseband processor 1103.

The baseband processor 1103 carries out digital baseband signal processing (data plane processing) and control plane processing for wireless communication. The digital baseband signal processing includes (a) data compression/decompression, (b) data segmentation/concatenation, (c) transmission format (transmission frame) generation/recovery, (d) transmission path coding/decoding, (e) modulation (symbol mapping)/demodulation, and (f) generation of OFDM symbol data (baseband OFDM signal) through inverse fast Fourier transform (IFFT). Meanwhile, the control plane processing includes communication management of layer 1 (e.g., transmission power control), layer 2 (e.g., wireless resource management and hybrid automatic repeat request (HARQ) processing), and layer 3 (e.g., signaling pertaining to attach, mobility, and call management).

For example, in the case of LTE and LTE-Advanced, the digital baseband signal processing of the baseband processor 1103 may include Packet Data Convergence Protocol (PDCP) layer, Radio Link Control (RLC) layer, MAC layer, and PHY layer signal processing. The control plane processing of the baseband processor 1103 may include Non-Access Stratum (NAS) protocol, RRC protocol, and MAC CE processing.

The baseband processor 1103 may include a modem processor (e.g., Digital Signal Processor (DSP)) that carries out the digital baseband signal processing and a protocol stack processor (e.g., central processing unit (CPU) or microprocessing unit (MPU)) that carries out the control plane processing. In this case, the protocol stack processor that carries out the control plane processing may be integrated with an application processor 1104, which will be described later.

The application processor 1104 is also referred to as a CPU, an MPU, a microprocessor, or a processor core. The application processor 1104 may include a plurality of processors (a plurality of processor cores). The application processor 1104 implements various functions of the UE 40 by executing a system software program (operating system (OS)) and various application programs (e.g., voice call application, WEB browser, email client, camera operation application, music player application) read out from a memory 1106 or another memory (not illustrated).

In some implementations, the baseband processor 1103 and the application processor 1104 may be integrated in a single chip as indicated by a dashed line (1105) in FIG. 13. In other words, the baseband processor 1103 and the application processor 1104 may be implemented as a single System on Chip (SoC) device 1105. The SoC device may also be referred to as a system Large Scale Integration (LSI) or a chip set.

The memory 1106 is a volatile memory, a non-volatile memory, or a combination thereof. The memory 1106 may include a plurality of memory devices that are physically independent of each other. The volatile memory is, for example, a static random-access memory (SRAM), a dynamic RAM (DRAM), or a combination thereof. The non-volatile memory is a mask read-only memory (MROM), an electrically erasable programmable ROM (EEPROM), a flash memory, a hard disk drive, or a desired combination thereof. For example, the memory 1106 may include an external memory device accessible from the baseband processor 1103, the application processor 1104, and the SoC 1105. The memory 1106 may include an embedded memory device integrated within the baseband processor 1103, the application processor 1104, or the SoC 1105. Furthermore, the memory 1106 may include a memory within a Universal Integrated Circuit Card (UICC).

The memory 1106 may store a software module (computer program) that includes a set of instructions and data for implementing the processing carried out by the UE 80 described in the foregoing embodiments. In some implementations, the baseband processor 1103 or the application processor 1104 may be configured to carry out the processing of the UE 40 described in the foregoing embodiments by reading out the software module from the memory 1106 and executing the software module.

Figure 14:
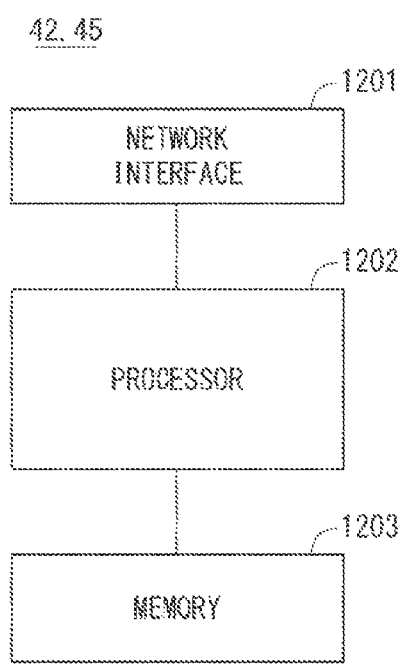
FIG. 14 is a configuration diagram of an MME and an SGW according to each embodiment.

FIG. 14 is a block diagram illustrating a configuration example of the MME 42 and the SGW 45. With reference to FIG. 14, the MME 42 and the SGW 45 each include a network interface 1201, a processor 1202, and a memory 1203. The network interface 1201 is used to communicate with a network node (e.g., SGSN 44, HSS 43, PGW 46, etc.). The network interface 1201 may include, for example, a network interface card (NIC) compliant with IEEE 802.3 series.

The processor 1202 implements the processing carried out by a center node 20 described with reference to the sequence diagrams and flowcharts in the foregoing embodiments by reading out software (computer program) from the memory 1203 and executing the software. The processor 1202 may be, for example, a microprocessor, an MPU, or a CPU. The processor 1202 may include a plurality of processors.

The processor 1202 carries out data plane processing and control plane processing including digital baseband signal processing for wireless communication. For example, in the case of LTE and LTE-Advanced, the digital baseband signal processing of the processor 1004 may include PDCP layer, RLC layer, and MAC layer signal processing. Furthermore, the signal processing carried out by the processor 1202 may include GTP-UUDP/IP layer signal processing in an X2-U interface and an S1-U interface. The control plane processing carried out by the processor 1004 may include X2AP protocol, S1-MME protocol, and RRC protocol processing.

The processor 1202 may include a plurality of processors. For example, the processor 1004 may include a modem processor (e.g., DSP) that carries out the digital baseband signal processing, a processor (e.g., DSP) that carries out the GTP-UUDP/IP layer signal processing in an S2-U interface and an S1-U interface, and a protocol stack processor (e.g., CPU or MPU) that carries out the control plane processing.

The memory 1203 is constituted by a combination of a volatile memory and a non-volatile memory. The memory 1203 may include a storage disposed away from the processor 1202. In this case, the processor 1202 may access the memory 1203 via an I/O interface (not illustrated).

In the example illustrated in FIG. 14, the memory 1203 is used to store software modules. The processor 1202 can implement the processing of an MEC server 40 described in the foregoing embodiments by reading out the software modules from the memory 1203 and executing the software modules.

As described with reference to FIGS. 12 to 14, each of the processors included in the eNB 51, the UE 40, the MME 42, and the SGW 45 according to the foregoing embodiments executes one or more programs including a set of instructions for causing a computer to execute the algorithms described with reference to the drawings.

In the foregoing examples, the program can be stored by the use of various types of non-transitory computer-readable media and provided to a computer. The non-transitory computer-readable media include various types of tangible storage media. Examples of the non-transitory computer-readable media include a magnetic recording medium (e.g., flexible disk, magnetic tape, hard disk drive), a magneto-optical recording medium (e.g., magneto-optical disk), a CD-ROM (read-only memory), a CD-R, a CD-R/W, and a semiconductor memory (e.g., mask ROM, PROM (programmable ROM), EPROM (erasable PROM), flash ROM, RAM (random-access memory)). The program may also be supplied to a computer in the form of various types of transitory computer-readable media. Examples of the transitory computer-readable media include an electric signal, an optical signal, and an electromagnetic wave. The transitory computer-readable media can provide the program to the computer via a wired communication line, such as an electric wire or an optical fiber, or via a wireless communication line.

It is to be noted that the present disclosure is not limited to the foregoing embodiments and can be modified as appropriate within the scope that does not depart from the technical spirit. In addition, the present disclosure may be implemented by combining the foregoing embodiments, as appropriate. An SGSN may be used in place of the MME described in the foregoing embodiments, and an RNC may be used in place of the eNB. In this case, the TAU is replaced by a Routing Area Update (RAU), and the GUTI, the S-TMSI, and the M-TMSI are replaced by a Packet-TMSI (P-TMSI). A Mobility Management Function (MMF) may be used in place of the MME described in the foregoing embodiments, a U-Plane Function (UPF) may be used in place of the SGW, and an NR may be used in place of the eNB.

Thus far, the invention of the present application has been described with reference to the embodiments, but the invention of the present application is not limited by the foregoing. Various modifications that a person skilled in the art can appreciate can be made to the configurations and the details of the invention of the present application within the scope of the invention.

This application claims priority to Japanese Patent Application No. 2016-215560, filed on Nov. 2, 2016, the entire disclosure of which is incorporated herein.

A part or whole of the foregoing embodiments can also be expressed in the following supplementary notes, but these supplementary notes are not limiting.

(Supplementary Note 1)

A gateway device comprising:
  a storage unit configured to store temporarily allocated identification information allocated to a communication terminal and an Extended Idle Mode Discontinuous Reception (eDRX) parameter associated with the communication terminal; and
  a transceiver configured to, in a case in which downlink data destined for a communication terminal managed by a mobility management device is received after a failure has occurred in the mobility management device, transmit a notification message with the temporarily allocated identification information and the eDRX parameter set therein to the mobility management device or another mobility management device.

(Supplementary Note 2)

The gateway device according to Supplementary Note 1, wherein the transceiver is configured to, in a case in which downlink data destined for a communication terminal managed by the mobility management device is received after the mobility management device has recovered from the failure that has occurred therein, transmit the notification message with the temporarily allocated identification information and the eDRX parameter set therein to the mobility management device.

(Supplementary Note 3)

The gateway device according to Supplementary Note 1 or 2, wherein the transceiver is configured to, in a case in which downlink data destined for a communication terminal managed by the mobility management device is received while the mobility management device has not recovered from the failure that has occurred therein, transmit the notification message with the temporarily allocated identification information and the eDRX parameter set therein to the other mobility management device.

(Supplementary Note 4)

The gateway device according to any one of Supplementary Notes 1 to 3, wherein the temporarily allocated identification information is a Globally Unique Temporary UE Identity (GUTI) temporarily allocated to a communication terminal or a System Architecture Evolution (SAE)-Temporary Mobile Subscriber Identity (S-TMSI) included in the GUTI.

(Supplementary Note 5)

The gateway device according to Supplementary Note 4, wherein the transceiver is configured to, transmit, to the mobility management device or the other mobility management device, the notification message with the GUTI or the S-TMSI, the eDRX parameter, and an International Mobile Subscriber Identity (IMSI) serving as identification information of the communication terminal set therein.

(Supplementary Note 6)

The gateway device according to any one of Supplementary Notes 1 to 5, wherein the gateway device is configured to determine a duration for which the temporarily allocated identification information and the eDRX parameter associated with each of the communication terminals are to be stored in the storage unit on the basis of a timer that defines a location update cycle of each of the communication terminals.

(Supplementary Note 7)

The gateway device according to any one of Supplementary Notes 1 to 6, wherein the transceiver is configured to, set a communication interval of the notification message to a predetermined duration or longer when transmitting a plurality of the notification messages.

(Supplementary Note 8)

A mobility management device comprising:
a transceiver configured to receive, from a gateway device storing temporarily allocated identification information allocated to a communication terminal and an Extended Idle Mode Discontinuous Reception (eDRX) parameter associated with the communication terminal, a notification message with the temporarily allocated identification information and the eDRX parameter set therein; and
a calculator configured to determine a timing at which a paging message is to be transmitted to a base station by the use of the temporarily allocated identification information and the eDRX parameter.

(Supplementary Note 9)

The mobility management device according to Supplementary Note 8, wherein
the transceiver is configured to transmit the temporarily allocated identification information and the eDRX parameter to the gateway device, and
in a case in which the transceiver receives the notification message with the temporarily allocated identification information and the eDRX parameter set therein after the mobility management device has recovered from a failure that has occurred therein, the calculator determines a timing at which a paging message is to be transmitted to a base station by the use of the temporarily allocated identification information and the eDRX parameter.

(Supplementary Note 10)

The mobility management device according to Supplementary Note 8, wherein in a case in which the mobility management device receives, from the gateway device, the notification message with temporarily allocated identification information and a DRX parameter transmitted to the gateway device from another mobility management device set therein, the calculator determines a timing at which a paging message is to be transmitted to a base station by the use of the temporarily allocated identification information and the eDRX parameter.

(Supplementary Note 11)

The mobility management device according to any one of Supplementary Notes 8 to 10, wherein the transceiver is configured to transmit a paging message with the temporarily allocated identification information and the eDRX parameter set therein to the base station.

(Supplementary Note 12)

The mobility management device according to any one of Supplementary Notes 8 to 11, wherein the temporarily allocated identification information is a Globally Unique Temporary UE Identity (GUTI) temporarily allocated to a communication terminal or a System Architecture Evolution (SAE)-Temporary Mobile Subscriber Identity (S-TMSI) included in the GUTI.

(Supplementary Note 13)

The mobility management device according to Supplementary Note 12, wherein the transceiver is configured to, in a case in which the transceiver receives, from the gateway device, the notification message with the GUTI or the S-TMSI, the eDRX parameter, and an IMSI serving as identification information of the communication terminal set therein, set the IMSI in the paging message.

(Supplementary Note 14)

A base station comprising:
a transceiver configured to receive, from a mobility management device, an eDRX parameter associated with a communication terminal, a Globally Unique Temporary UE Identity (GUTI) temporarily allocated to a communication terminal or a System Architecture Evolution (SAE)-Temporary Mobile Subscriber Identity (S-TMSI) included in the GUTI serving as temporarily allocated identification information, and an IMSI serving as identification information of the communication terminal; and
a calculator configured to calculate a timing at which the communication terminal is to be paged by the use of the temporarily allocated identification information and the eDRX parameter,
wherein the transceiver is configured to carry out paging by the use of the IMSI at the timing calculated by the calculator.

(Supplementary Note 15)

A communication method comprising:
storing temporarily allocated identification information allocated to a communication terminal and an eDRX parameter associated with the communication terminal; and
transmitting, in a case in which downlink data destined for a communication terminal managed by a mobility management device is received after a failure has occurred in the mobility management device, a notification message with the temporarily allocated identification information and the eDRX parameter set therein to the mobility management device or another mobility management device.

(Supplementary Note 16)

A control method comprising:
receiving, from a gateway device storing temporarily allocated identification information allocated to a communication terminal and an eDRX parameter associated with the communication terminal, a notification message with the temporarily allocated identification information and the eDRX parameter set therein; and
determining a timing at which a paging message is to be transmitted to a base station by the use of the temporarily allocated identification information and the eDRX parameter.

(Supplementary Note 17)

A paging method comprising:
receiving, from a mobility management device, an eDRX parameter associated with a communication terminal, a GUTI temporarily allocated to a communication terminal or an S-TMSI included in the GUTI serving as temporarily allocated identification information, and an IMSI serving as identification information of the communication terminal;
calculating a timing at which the communication terminal is to be paged by the use of the temporarily allocated identification information and the eDRX parameter; and
paging by the use of the IMSI at the calculated timing.

(Supplementary Note 18)

A program that causes a computer to execute:

storing temporarily allocated identification information allocated to a communication terminal and an eDRX parameter associated with the communication terminal; and transmitting, in a case in which downlink data destined for a communication terminal managed by a mobility management device is received after a failure has occurred in the mobility management device, a notification message with the temporarily allocated identification information and the eDRX parameter set therein to the mobility management device or another mobility management device.

(Supplementary Note 19)

A program that causes a computer to execute:

receiving, from a gateway device storing temporarily allocated identification information allocated to a communication terminal and an eDRX parameter associated with the communication terminal, a notification message with the temporarily allocated identification information and the eDRX parameter set therein; and determining a timing at which a paging message is to be transmitted to a base station by the use of the temporarily allocated identification information and the eDRX parameter.

(Supplementary Note 20)

A program that causes a computer to execute:

receiving, from a mobility management device, an eDRX parameter associated with a communication terminal, a GUTI temporarily allocated to a communication terminal or an S-TMSI included in the GUTI serving as temporarily allocated identification information, and an IMSI serving as identification information of the communication terminal;

calculating a timing at which the communication terminal is to be paged by the use of the temporarily allocated identification information and the eDRX parameter; and paging by the use of the IMSI at the calculated timing.

REFERENCE SIGNS LIST

10 GATEWAY DEVICE
11 STORAGE UNIT
12 TRANSCEIVER
20 MOBILITY MANAGEMENT DEVICE
40 UE
41 E-UTRAN
42 MME
43 HSS
44 SGSN
45 SGW
46 PGW
47 PCRF
48 UTRAN
49 GERAN
50 OPERATOR'S IP SERVICES
51 eNB
61 TRANSCEIVER
62 CONTROLLER
71 CALCULATOR
72 TRANSCEIVER
81 CALCULATOR
82 TRANSCEIVER

The invention claimed is:

1. A first mobility management device comprising:
a memory; and
a processor coupled with the memory,
wherein the processor is configured to:
communicate with a Core Network (CN) node,
based on detection of a failure of a second mobility management device configured to use a first identifier for a mobility management procedure for a User Equipment (UE), receive, from the CN node, information related to the UE including the first identifier, wherein the UE is configured to perform a Registration Procedure using the first identifier, and
send a message to a Radio Access Network (RAN) node,
wherein the message includes a second identifier related to the UE and a third identifier related to the UE,
wherein the second identifier corresponds to the first identifier, and
wherein the RAN node is configured to use the third identifier.

2. The first mobility management device according to claim 1, wherein the Registration Procedure is an Initial Registration.

3. The first mobility management device according to claim 1, wherein the first mobility management device and the second mobility management device are included in a same set of mobility management devices.

4. A User Equipment (UE) comprising:
a memory; and
a processor coupled with the memory, wherein the processor is configured to:
communicate with a Radio Access Network (RAN) node; and
perform a Registration Procedure using a first identifier with which a first mobility management device is configured;
wherein the first mobility management device is configured to transmit information related to the UE, including the first identifier, to a Core Network (CN) node,
wherein the first mobility management device is further configured to use the first identifier for a mobility management procedure for the UE, and
wherein a second mobility management device is configured to retrieve, from the CN node, the information including the first identifier, based on detection of a failure of the first mobility management device, and is further configured to send a message to a Radio Access Network (RAN) node,
wherein the message includes a second identifier related to the UE and a third identifier related to the UE,
wherein the second identifier corresponds to the first identifier, and
wherein the RAN node is configured to use the third identifier.

5. The UE according to claim 4, wherein the Registration Procedure is an Initial Registration.

6. The UE according to claim 4, wherein the first mobility management device and the second mobility management device are included in a same set of mobility management devices.

7. A method of a first mobility management device, the method comprising:
communicating with a Core Network (CN) node,
based on detection of a failure of a second mobility management device configured to use a first identifier for a mobility management procedure for a User Equipment (UE), retrieving, from the CN node, information related to the UE including the first identifier,
wherein the UE is configured to perform a Registration Procedure using the first identifier, and
sending a message to a Radio Access Network (RAN) node,
wherein the message including a second identifier related to the UE and a third identifier related to the UE,
wherein the second identifier corresponds to the first identifier, and
wherein the RAN node is configured to use the third identifier.

8. The method according to claim 7, wherein the Registration Procedure is an Initial Registration.

9. The method according to claim 7, wherein the first mobility management device and the second mobility management device are included in a same set of mobility management devices.

10. A method of a User Equipment (UE), the method comprising:
communicating with a Radio Access Network (RAN); and
performing a Registration Procedure using a first identifier with which a first mobility management device is configured;
wherein the first mobility management device is configured to transmit information related to the UE, including the first identifier, to a Core Network (CN) node,
wherein the first mobility management device is further configured to use the first identifier for a mobility management procedure for the UE, and
wherein a second mobility management device is configured to retrieve, from the CN node, the information including the first identifier, based on detection of a failure of the first mobility management device, and wherein is further configured to send a message to a Radio Access Network (RAN) node,
wherein the message includes a second identifier related to the UE and a third identifier related to the UE,
wherein the second identifier corresponds to the first identifier, and
wherein the RAN node is configured to use the third identifier.

11. The method according to claim 10, wherein the Registration Procedure is an Initial Registration.

12. The method according to claim 10, wherein the first mobility management device and the second mobility management device are included in a same set of mobility management devices.

* * * * *